US006753635B2

(12) United States Patent
Kuhlmann-Wilsdorf

(10) Patent No.: US 6,753,635 B2
(45) Date of Patent: Jun. 22, 2004

(54) MANAGEMENT OF CONTACT SPOTS BETWEEN AN ELECTRICAL BRUSH AND SUBSTRATE

(75) Inventor: Doris Kuhlmann-Wilsdorf, Charlottesville, VA (US)

(73) Assignee: Hi Per Con, Charlottesville, VA (US)

( * ) Notice: Subject to any disclaimer, the term of this patent is extended or adjusted under 35 U.S.C. 154(b) by 169 days.

(21) Appl. No.: 09/839,404

(22) Filed: Apr. 23, 2001

(65) Prior Publication Data

US 2002/0060506 A1 May 23, 2002

Related U.S. Application Data

(63) Continuation of application No. PCT/US99/24480, filed on Oct. 22, 1999.

(60) Provisional application No. 60/105,319, filed on Oct. 23, 1998.

(51) Int. Cl.[7] .......................... H02K 13/00; B32B 1/00

(52) U.S. Cl. ....................... 310/233; 310/236; 428/687; 29/596

(58) Field of Search ................................ 428/143, 163, 428/167, 600, 601, 614, 687, 611; 310/232, 233, 236; 29/826, 596, 597, 598

(56) References Cited

U.S. PATENT DOCUMENTS

| | | | | |
|---|---|---|---|---|
| 1,495,780 A | * | 5/1924 | Eschholz et al. | 310/232 |
| 4,358,699 A | * | 11/1982 | Wilsdorf | 310/251 |
| 4,398,113 A | * | 8/1983 | Lewis et al. | 310/232 |
| 4,415,635 A | * | 11/1983 | Wilsdorf et al. | 310/248 |
| 4,426,594 A | * | 1/1984 | Hirano et al. | 29/597 |
| 5,083,055 A | * | 1/1992 | Hokanson | 310/220 |
| 5,742,111 A | * | 4/1998 | Reed | 310/227 |
| 6,245,440 B1 | * | 6/2001 | Kuhlmann-Wilsdorf et al. | 29/826 |

FOREIGN PATENT DOCUMENTS

WO WO 97/37847 * 10/1997

* cited by examiner

*Primary Examiner*—John J. Zimmerman

(57) ABSTRACT

Devices for the management of contact spots, partly consisting of surface plating, partly of surface polishing and partly of substrate surface profiling in the form of parallel grooves stretched out in the direction of sliding and/or of isolated asperities. The management of the contact spots is designed to generate, at electrical brush interfaces, a large number of contact spots of pre-determined shapes and distribution that promote low electrical contact resistance and long wear life. Preferably, the substrate is coated with a hard, highly conductive coating that is resistant to wear and chemical attack. The invention is similarly applicable also to electrical switches wherein it will assure reduction of interfacial resistance as well as of sticking forces. Finally, it may also be used for the efficient transfer of heat across interfaces.

76 Claims, 6 Drawing Sheets

Fig. 5A
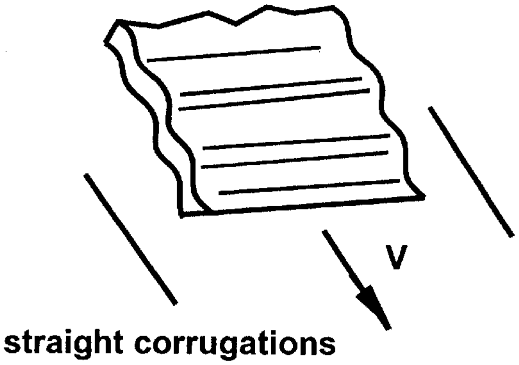
straight corrugations
Fig. 5B
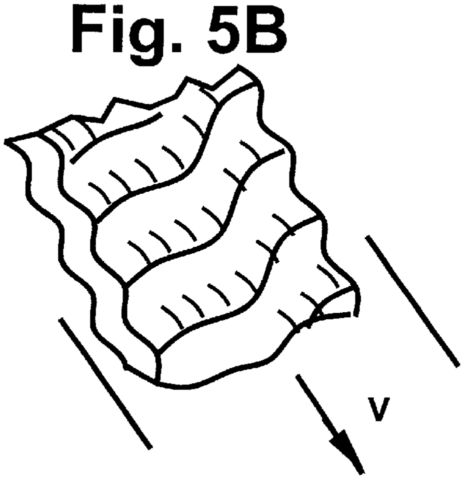
wavy corrugations
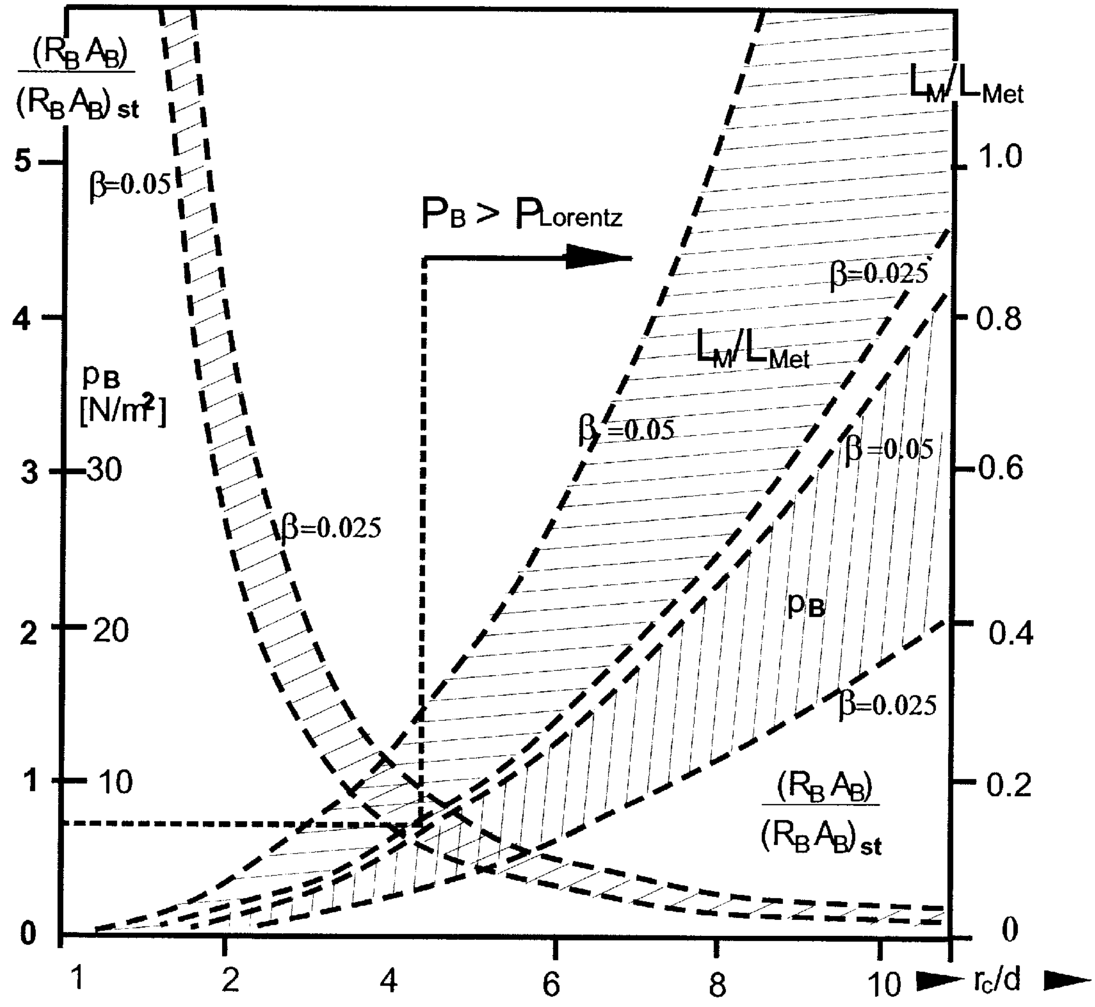
Fig. 6

MANAGEMENT OF CONTACT SPOTS BETWEEN AN ELECTRICAL BRUSH AND SUBSTRATE

CROSS-REFERENCES TO RELATED APPLICATIONS

This application claims priority to U.S. Provisional Application Serial No. 60/105,319 filed on Oct. 23, 1998. This application is a continuation application of PCT Application PCT/US99/24480, filed on Oct. 22, 1999, which was published in English. This application is also related to U.S. Pat. Nos. 4,358,699 and 4,415,635. The application is also related to issued U.S. Pat. No. 6,245,440, issued on Jun. 12, 2001, which claims priority to a provisional application Ser. No. 60/014,753, filed on Apr. 5, 1996. The above-noted applications are herein incorporated by reference.

This invention was made in part by funds provided by the U.S. Department of the Navy. The U.S. Government may therefore have certain rights in the invention.

BACKGROUND OF THE INVENTION

1. Field of the Invention

This invention relates generally to the management of so-called contact spots through which, on a micro-scopic scale, electrical currents are conducted across interfaces of solids, whether between the two sides of switches or between sliding as well as stationary electrical brushes and their substrates, being mostly but not exclusively slip rings and commutator bars.

The electrical brushes at issue include fiber brushes disclosed in the above-noted U.S. Pat. Nos. 4,358,699 and 4,415,635, and in U.S. Pat. No. 6,245,440. Additionally, they include foil brushes as described in the publication "Production and Performance of Metal Foil Brushes," P. B. Haney, D. Kuhlmann-Wilsdorf and H. G. F. Wilsdorf, WEAR, 73 (1981), pp. 261–282, which is also incorporated by reference, and ordinary monolithic brushes made of graphite or graphite-metal mixtures. The invention is also applicable to electrical switches for the reduction of resistance and sticking forces, as well as to devices for efficient heat transfer.

The present invention includes the use of various technologies referenced and described in the above-noted U.S. Patents and Applications, as well as described in the references identified in the appended APPENDIX and cross-referenced throughout the specification by reference to the corresponding number, in brackets, of the respective references listed in the APPENDIX, the entire contents of which, including the related patents and applications listed above and the references listed in the APPENDIX, are incorporated herein by reference.

2. Discussion of the Background

Sliding electrical contacts, i.e., "brushes", conduct electrical current between solids, very preponderantly metals, in relative motion. Brushes are in widespread use in various types of electric motors and generators and are also widely used in less common but numerous special applications, e.g. telemetry devices and rotating antennae. Even while to date the traditional "monolithic" (i.e., in the form of a solid piece) graphite-based (i.e., including compacted graphite or various metal-graphite mixtures) brushes are overwhelmingly frequent, they have a number of technological limitations. Specifically, monolithic graphite-based brushes cannot be reliably used, over extended periods of time, at current densities above about 30 Amp/cm$^2$, nor at sliding speeds above about 25 m/sec. Further, as a coarse estimate, they waste about one watt per ampere conducted across the brush-substrate interface, i.e. the equivalent of one Volt, in terms of Joule and friction heat. Further, they emit significant intensities of electromagnetic waves (i.e., they are electrically very noisy so as to interfere with radio and similar signal reception), and finally they wear into a powdery debris that can be highly detrimental in electrical machinery, especially aboard submarines.

As a result of these shortcomings of traditional monolithic brushes, a number of otherwise very attractive technological developments are stymied for lack of electrical brushes which will conduct reliably over extended time periods, much higher current densities at low losses up to much higher speeds. Most importantly impacted are so-called "homopolar" motors and generators. They have potentially very high power densities and would be excellent for Navy ship drives, among others, but typically require current densities in excess of one hundred Amperes per cm$^2$ to be conducted across interfaces of metal parts relatively moving at sustained speeds up to of 30 m/sec or even more while producing or requiring EMF's of only 20V or so. The requirements of homopolar machinery in terms of current densities and speeds can thus not be fulfilled by monolithic brushes, and in any event a loss of 2 Volts per monolithic brush pair, i.e., in and out, is prohibitive for homopolar machines.

In previous inventions, particularly in the Patent Application "Continuous Metal Fiber Brushes, [1]" the capabilities of metal fiber brushes, including multitudes of essentially parallel hair-fine metal fibers, are outlined. They are intrinsically capable of easily conducting the desired current densities and to do so up to at least 70 m/sec with a total loss in the order of 0.1 Volt per brush. At the same time such brushes are electrically very quiet. These superior qualities derive from large numbers of separate electric "contact spots", namely at the fiber ends at the brush "working surface" sliding along the brush-substrate interface, through which the current is physically conducted on a microscopic scale. That current is conducted across solid interfaces only through a restricted number of contact spots, whose total area amounts to only fractions of one percent of the macroscopic area of contact, is a well-known general physical phenomenon. To a large extent the poor qualities of monolithic brushes arise from their small number of contact spots, namely in the order of ten per brush. As a result, the current flow lines in monolithic brushes are not rather uniformly distributed, as they are in metal fiber brushes, but they are "constricted [2]" at the few contact spots. This causes the corresponding "constriction resistance" that represents in the order of one third the resistance of monolithic brushes.

The superiority of metal fiber brushes does not only derive from their thousands of evenly distributed contact spots, but also from the fact that at their contact spots bare metal meets bare metal, ideally separated only by a double monomolecular layer of adsorbed water vapor. Fortuitously, this most favorable type of lubrication, which prevents cold-welding and accommodates the relative motion between brush and substrate at a "film resistivity" of only $\sigma_F$–$1\times10^{-12}$ $\Omega m^2$ and average friction coefficient ($\mu$) of about 0.3, establishes itself automatically at any modest ambient humidity, provided that undue contamination with oils, etc., is avoided. By contrast, monolithic brushes deposit a lubricating graphitic layer through which the current must flow at much higher electrical film resistivity. Further, the body resistance of graphitic brushes can be significant while it is always negligible for metal fiber brushes. Finally, monolithic brushes are hard and "bounce". At increasing speed, that "brush bounce" must be counteracted by an increasingly strong pressure between brush and substrate at the correspondingly increased friction power loss. Practically speaking, this syndrome limits the sliding speed of monolithic brushes to about 25 m/sec, as already indicated, whereas metal fiber brushes are intrinsically flexible (i.e., have a much larger "mechanical compliance"). Therefore, they can and should be mechanically only lightly loaded and can be operated to high speeds at only minor friction heat loss.

Metal foil brushes [3] closely resemble metal fiber brushes except that they are composed not of substantially parallel fibers but of thin parallel foils. Consequently they typically have many fewer, but otherwise the same kind of, contact spots. Thus metal foil brushes are very similar to metal fiber brushes but cannot match their attainable current densities, sliding speeds and low power losses. At any rate, foil brushes are based on the same principle as metal fiber brushes, namely electrical contact to the substrate at a large number of microscopically small, bare metal-metal contact spots, optimally lubricated by a double monomolecular layer of adsorbed water. Hence, also, in terms of number of contact spots per unit working surface area (i.e., "contact spot density"), and mechanical load per contact spot, exactly the same theory applies to metal foil as to metal fiber brushes [4–6].

As stressed, on account of their different geometry, foil brushes comprise a substantially smaller density of contact spots than well-constructed metal fiber brushes. By way of numerical example, the working surface of a typical metal fiber brush constructed of d=50 $\mu$m copper wires of about f=15% packing fraction contains roughly 10,000 contact spots per cm$^2$, namely at the individually flexible fiber ends. In a foil brush with, say, $d_f$=25 $\mu$m thick parallel foils and f=50% packing fraction, there are about 600 contact spots per cm$^2$, located at the foil edges sliding on the substrate, with an estimated three contact spots per foil edge [3]. Correspondingly, without suitable modifications of the substrate, foil brushes will be very superior to monolithic brushes but fall short of metal fiber brushes.

In the background art, it has long since been recognized that the quality of the substrate surface preparation has a strong impact on brush performance in terms, especially, of electrical resistance and wear rate. The latter is commonly stated in terms of "dimensionless wear rate", $\Delta l/L$, i.e. brush shortening through wear divided by the sliding path length. Dimensionless wear rates in the low $10^{-11}$ range are generally desired, and better of about $10^{-12}$. To put this last figure in perspective, consider that even fast running machines will rarely exceed sustained speeds of v=40 m/sec of relative motion between brush and substrate, and that a machine overhaul would probably be necessary after one year, i.e. $t=3.15\times10^7$ sec, independent of brush performance. The desired sliding path length is then $L=tv=1.26\times10^9$ m. With a dimensionless wear rate of $\Delta l/L=10^{-12}$ the brush would thus have worn by $\Delta l=10^{-12}\times1.26\times10^9$ m=1.3 mm between maintenance periods. With a long brush and built-in high mechanical compliance, such brush shortening might well be accommodated without any mechanical forward motion of the current connection between brush and machinery, simply through elastic deformation of the brush body at tolerable decrease of brush force. Simultaneously with this great simplification of brush force application, there would be much less wear debris than for monolithic brushes, especially in view of the typically much higher current densities (i.e., smaller areas of brush working surface), and that only the "packing fraction" of f≅15% of the brush body is occupied by fibers, while the 85% voidage generates no debris. Distinctly less favorable but still highly acceptable would be a $10^{-11}$ dimensionless wear rate accompanied by 1.3 cm brush shortening and ten times the wear debris. However, such shortening, and in any event short brushes, would require some mechanical means for advancing the brush as it wears, thereby maintaining the brush force approximately constant, i.e. within a factor of about two or less.

The discussed low dimensionless wear rates are not easily achieved. In fact, wear particles form at contact spots where these momentarily mechanically interlock across the interface (i.e., through a momentary mechanical interlocking of brush and substrate). That this is so has been previously shown by Y. J. Chang and the inventor [7,8] and strong additional support for this fact has been obtained by J. L. Young in an M. S. thesis recently completed under the inventor's supervision [9]. It follows, then, that wear will be strongly reduced by making the substrate as hard and as smooth as possible. Proposals to do so with the lowest possible loss of electrical conductivity are a large part of the present invention.

Even though the theoretical background outlined above is available in the open literature, with extensive research and theoretical studies on electrical contact spots going back to the outstanding pioneering research by R. Holm [2], no previous directed attempt is known to modify substrates with the particular aim of influencing the number of morphology of contact spots for the purpose of improving electrical brush conduction and/or wear rates, as done herein. In the past it was simply recognized that substrate "run-out" (i.e., radial deviations in the course of one revolution), should be kept low and that, before use, substrates should be smoothed with fine emery paper. Further, routinely monolithic brushes contain mild abrasives to "clean" the contact, besides the fact that by itself graphite abrades. However, it seems that in the past only the inventor and co-workers have endeavored to discover the underlying reasons which according to the present invention are based on contact spot behaviors. The only modification of substrate shapes for the improvement of brush performance to ever come to the inventor's notice, is a spiral groove used in the Westinghouse laboratories that was claimed to counteract aerodynamical lift of monolithic brushes.

SUMMARY OF THE INVENTION

The present invention presents methods for the management of the contact spots at brush-substrate interfaces of all three types of electrical brushes. The favorable impact of the management of contact spots according to the present invention may be the greatest on the performance of metal foil brushes which as a result may well become competitive with metal fiber brushes, but is expected to be significant to strong also for metal fiber and monolithic brushes. This management of the contact spots is mainly effected through suitable shaping and otherwise conditioning the substrate surface, and to a lesser extent also through modifications of the brush working surfaces, especially in connection with commutation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A and 5B illustrate examples of corrugations in foils of foil brushes; and FIG. 6 illustrates the forecast performance of Cu fiber brushes of f=15% packing fraction as a function of $r_c/d$, i.e. the ratio of the substrate's average asperity radius of curvature to fiber diameter, when local pressure at the contact spots is so low, namely $1.5\times10^4$ N/cm², as to engender a friction of $\mu=0.02$ on account of a ≅1 nm thick moisture film.

Figure 1A:
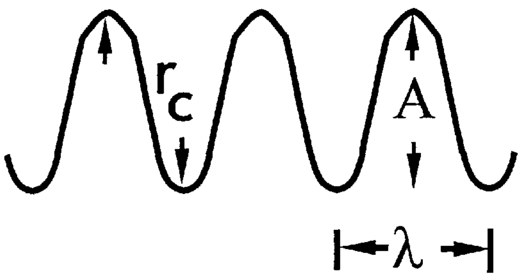
FIGS. 1A–1E show examples of schematic cross-sectional views of different profiles of brush substrates and resulting contact spots.

DESCRIPTION OF THE PREFERRED EMBODIMENTS a) General Considerations on Contact Spots of Metal Fiber and Metal Foil Brushes The contact spot density at the brush-substrate interface is of paramount importance because it controls both, the electrical resistance across the interface and $p_{trans}$, the critical brush pressure below which the average contact spot is elastic. For metal fiber brushes, theory [4–6] shows this to be $$p_{trans} \cong \alpha 3\times10^{-4} fH \quad (1)$$

where α is the number of contact spots per fiber end (believed to be close to unity), f is the packing fraction already introduced (i.e., the fraction of brush volume occupied by fibers, the remainder being voidage), and H the hardness of the brush fiber material, which generally should be smaller than, or at most equal to, the hardness of the substrate. Next, the number of contact spots per unit area of fiber brush working surface is $$n^* = \alpha f/(\tfrac{1}{4}\pi d^2) \quad (2)$$

with d the fiber diameter. Eq. 1 follows if the asperity radius of the contact spots is assumed to be $$r_c = d/2 \quad (3)$$

which is a reasonable assumption and has so far been borne out by experimental evidence. In that case the average contact spot pressure is, in the case of elastic contact spots, $$_{el}p_c(\beta) = \beta^{1/3} H \approx 0.004\beta^{1/3} E \quad (4)$$

assuming that Young's modulus is related to the hardness as (very approximately) $E \approx H/0.004$, and where β is the ratio of the actual brush pressure to the transition brush pressure, i.e., $$\beta = p_B/p_{trans} \quad (5)$$

Note that, remarkably, $p_{trans}$ (eq. 1) is independent of fiber diameter. This arises because, as stated, the asperity radius has been assumed to be d/2 (eq.3) Correspondingly, for copper brushes with α=1, $E \approx 1.1\times10^{11}$ N/m² and $H \approx 5\times10^8$ N/m², $$_{Cu}p_{trans} = 2\,{}_{Cu}p_{safe} \approx 15f(\mathrm{N/cm^2}) \leqq 4(\mathrm{N/cm^2}) \approx 6\ \mathrm{lb/in^2} \quad (6)$$

With negligible brush body and constriction resistances, then, in the realm of elastic contact spots the fiber brush resistance is found as $$R_B = \sigma_F/A_C = \sigma_F({}_{el}p_C/p_B)/A_B < \sigma_F(H/p_B)/A_B \quad (7)$$

where $\sigma_F$ (mostly $\sigma_F = 10^{-12}\ \Omega m^2$) is the specific resistivity, i.e. the resistance of unit area, of the film separating the two sides at the contact spots, as already introduced above. Or, including the above assumptions on contact spot number and asperity curvature, $$R_B A_B . 0.034[\mathrm{m\Omega cm^2}]/(f\beta^{2/3}) \quad (8)$$

The above considerations are supported by Reichner's early tests [10–12] on metal "fiber brushes." In these he used metal wire brushes made from unraveled grounding cable with about 127 μm wire diameter. Under gravity load on a polished slip ring in laboratory conditions these evidently operated with elastic contact spots since Reichner obtained approximately the same low brush resistance that had already been documented for fiber brushes made with fibers in the order of d=20 μm [13–15], which implies for Reichner's laboratory studies, asperity radii of curvature of $r_c \approx 0.1$ mm or more. In those careful laboratory studies, Reichner also observed very low wear rates. However, installed in a homopolar motor, Reichner's brushes failed in short order (see ref.4). In light of the critical importance of elastic contact spots for achieving low wear rates this is not surprising: Namely when contact spots are elastic, i.e. are not subject to constantly varying permanent plastic deformation, the necessary strain for interlocking and wear chip formation cannot be attained so that elastic contact spots should not wear at all. Even so, there is some wear also below $p_{trans}$ where the average contact spot is elastic. This is due to the statistical spread of local pressures at the fiber ends, to the effect that no matter how well constructed the brush and how low the average brush pressure may be, from moment to moment some contact spots are bound to be in the plastic regime and therefore give rise to wear, albeit under laboratory conditions very slow and thus yielding the already cited dimensionless wear rates in the $10^{-11}$ range and lower. This also explains why in the realm of on average elastic contact spots, i.e. for brush pressures below $p_{trans}$ or β<1, dimensionless wear rates are very pressure sensitive whereas above $p_{trans}$ wear rises linearly with the brush pressure in accordance with the Holm-Archard wear law (compare ref. 16). Reichner's data show that under well-controlled laboratory conditions even brushes made of coarse wires can perform with elastic contact spots if they have been very carefully shaped and kept free of oscillations, but certainly not in a real motor.

In the above discussion, the contact spot radius of curvature is emphatically not the average radius of the contact spot area. Rather, it is the radius of curvature normal to the average surface orientation. Namely, contact spots are formed where asperities of one side either meet an asperity of the other side or simply impact on a more or less flat area. Traditionally, ever since Holm (compare Appendix I of ref. 2), contact spots are modeled as "Hertzian contacts," i.e., as hard spherical asperities of radius $r_c$ impinging on a softer flat substrate of Meyer impression hardness H. Based on the derivation given in refs. 2 and 6 the relevant relationships, which also underlie the preceding equations, are these: Under applied force P acting on n similar asperities, and as long as the encounter is elastic, the resulting radius of the load-bearing (and potentially current-carrying) contact spots in the interface will be $$_{el} = 1.1(r_c P/nE)^{1/3} \quad (9)$$

Hence the average pressure over the area of the average elastic contact spot is, with $H \approx 0.004E$ and n* the contact spot density i.e. number of contact spots per unit area of interface, $$_{el}p_c=P^{1/3}E^{2/3}(n^{1/3}\pi 1.1^2 r_c^{2/3})\approx 0.26(p_B E^2/n^* r_c^2)^{1/3}\approx 10.44(p_B H^2/n^* r_c^2)^{1/3} \quad (10)$$

Thus at given contact spot density the average local pressure at the contact spots is proportional to $r_c^{-2/3}$. The critical applied pressure at which elastic contact spots will transition to become plastic, $p_{trans}$, of eq. 1, is obtained by equating the average pressure of the Hertzian elastic contact spot with H, i.e. the expected average pressure for plastic contact spots, and is found as $$p_{trans}\approx 9\times10^{-4} H n^* r_c^2 \approx 3.5\times10^{-6} E n^* r_c^2 \quad (11)$$

The desirable elastic contact spots which give low wear rates are therefore favored by large asperity radii of curvature as well as high contact spot densities.

The theory of metal fiber brushes has been developed in considerable detail and a great wealth of evidence supports it with the empirical already discussed result that for metal fiber brushes $r_c\approx d/2$, i.e. the fiber radius. However, that is not a necessary condition, just an intuitively plausible and empirically strongly supported observation. Moreover, for geometrical reasons persistent contact spots are bound to be stationary with respect to the geometrically smaller side, i.e. the fiber ends. And yet, since wear of the substrates, whether slip rings or commutator bars, is to be kept to an absolute minimum while the brushes may wear, the fiber material (and by implication the foil material of foil brushes) must be made softer, or at the least not harder, than the substrate material. The Hertzian model of contact spots is thus basically flawed in that, without special management in accordance with the present invention, the persistent asperities are located on the brushes, the softer side. In the present invention the implications of this state of affairs are considered and found to lead to the desired possibility of manipulating contact spots so as to make them more numerous and/or to be associated with larger asperity radii of curvature.

The basic difficulty of foil brushes compared to fiber brushes is evidently many fewer contact spots and thus a tendency for the conversion into the high wear regime at an unnecessarily low value of $p_{trans}$. Even so, with elastic contact spots foil brushes perform very much like fiber brushes, as documented by Haney et al. already cited [3] and according to informal oral communication more recently by measurements at IAP, Dayton, Ohio. With three contact spots per foil, the transition from the linear Holm-Archard wear law to the much slower wear rates associated with elastic contact spots may perhaps occur at $\beta=1/3$ or even less, so that in the elastic contact spot regime at same pressure the foil brush resistance would be $1/\beta^{2/3}\cong 1/3^{2/3}\cong 2$ times larger than fiber brushes. Worse, since a larger fraction of the spots would be plastic, foil brush wear rates, too, are expected to be correspondingly higher. Yet, we are handicapped in trying to make reasoned estimates since we do not know the applicable asperity radii of curvature, $r_c$, for foil brushes. Presumably, like the case of Reichner's thick wires, rather large radii of curvature may be coincidentally established at carefully constructed and operated foil brushes. This does not take away from the point to be made here that the origin of such coincidental superior performance would be obscure, and that it could therefore not be achieved routinely and purposefully. By contrast, foil brushes could be made routinely competitive with metal fiber brushes if the number of contact spots per foil edge could be reliably, drastically increased as via the present invention.

For the remainder, fiber and foil brushes each have their peculiar advantages and disadvantages. Specifically, foil brushes are more easily made and are liable to be rather cheaper. On the downside, foil brushes offer less flexibility in terms of cross-sectional shapes as well as brush holding and loading. But yet again, the packing fraction of foil brushes can be made rather higher than the f=0.15 typical for metal fiber brushes, in fact depending on angle of attack up to near 100% [3]. This permits correspondingly higher current densities and also higher brush pressures which simplifies brush loading. The jury is still out in regard to commutation. Present best indications are that without modifications foil brushes arc more readily than fiber brushes do, and again without modifications are presumably less suitable for commutating applications than metal fiber brushes. On the other hand, measures for arc suppression at the trailing ends of brushes are more readily incorporated into foil than fiber brushes.

b. Modifying the Substrate for Pre-selected Contact Spot Densities and Asperity Radii In accord with the above considerations, all brushes could benefit from a means to control the number, shapes and wear rates of contact spots so as to increase the contact spot density and the radii of asperity curvature. In the present invention it is proposed to do that through modifying the harder substrate and specifically to provide it with multitudes of microscopically smooth asperities and/or grooves parallel to the sliding direction to provide the desired contact spots. In this case, even while the asperities will rarely be spherical, they will at least be stationary on the harder side as envisaged in the Hertzian model. Clearly, for these contact spots to persist over the life of a machine, the slip ring or commutator bar surfaces must be made either considerably harder than the fibers or foils, or both must be made so hard that no wear occurs.

Choices of geometrical shapes and arrangements of asperities and grooving will presumably be based on test results, and may well depend somewhat on machine characteristics. In general, asperities could be arranged randomly or in any desired pattern, and similarly the profiles of grooving need not be regular. Pending test results, however, it is expected that the most effective dimensions of asperities and grooving will be in the order of the foil thickness and fiber diameter, respectively, both in and normal to the average surface of the slip ring or commutator bars, as the case may be. Further, tests are expected to confirm that grooves should optimally be parallel to the sliding direction and extend unbroken about the whole slip ring or set of commutator bars, so that the counterface profile seen by the individual foil does not change in the course of sliding. The intended result here is that specifically foil brushes would wear-in into a profile that lets them smoothly track the counterface profile and thereby establish multitudes of persistent contact spots per foil at little subsequent wear. Or else, the wearing-in period could be by-passed through providing foil brushes with a profiling that matches the grooving pattern of the substrate as adjusted for the angle of attack of the foils. However, unless or until some standardized types of grooving should be developed in the future, this is a likely option only for very exacting conditions, firstly because of the extra expense involved and secondly because it would make the brushes highly specific for particular machines. To incur these disadvantages would only rarely be justified on account of the small wear-in depths involved. Either way, the radii of asperity curvature, $r_c$, can now be chosen at will through the profiling of the troughs and crests of the grooving as indicated in FIG. 1.

Figure 2A:
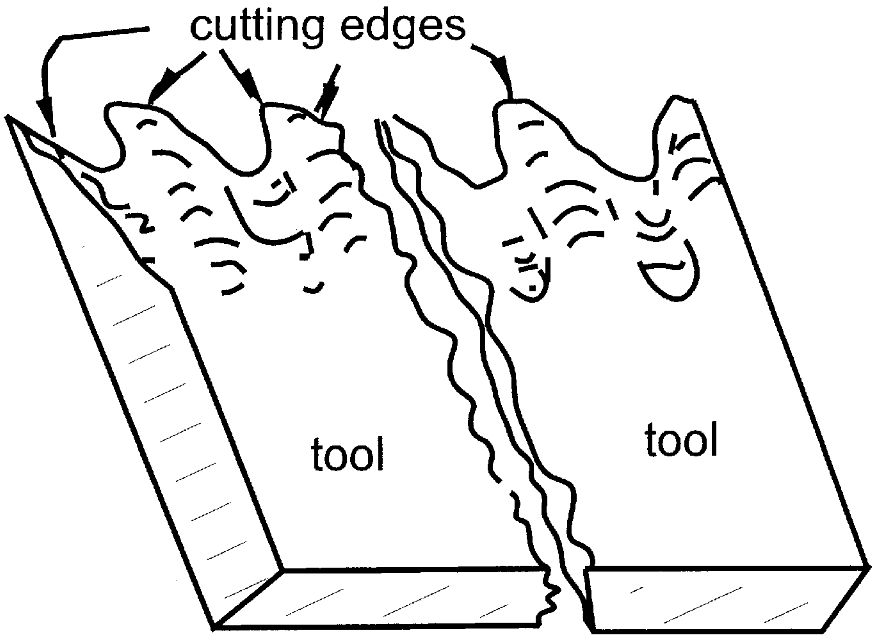
FIG. 2A shows a schematic perspective view of a tool with a wave-shaped cutting edge for cutting a grooving profile into a substrate.
Figure 2B:
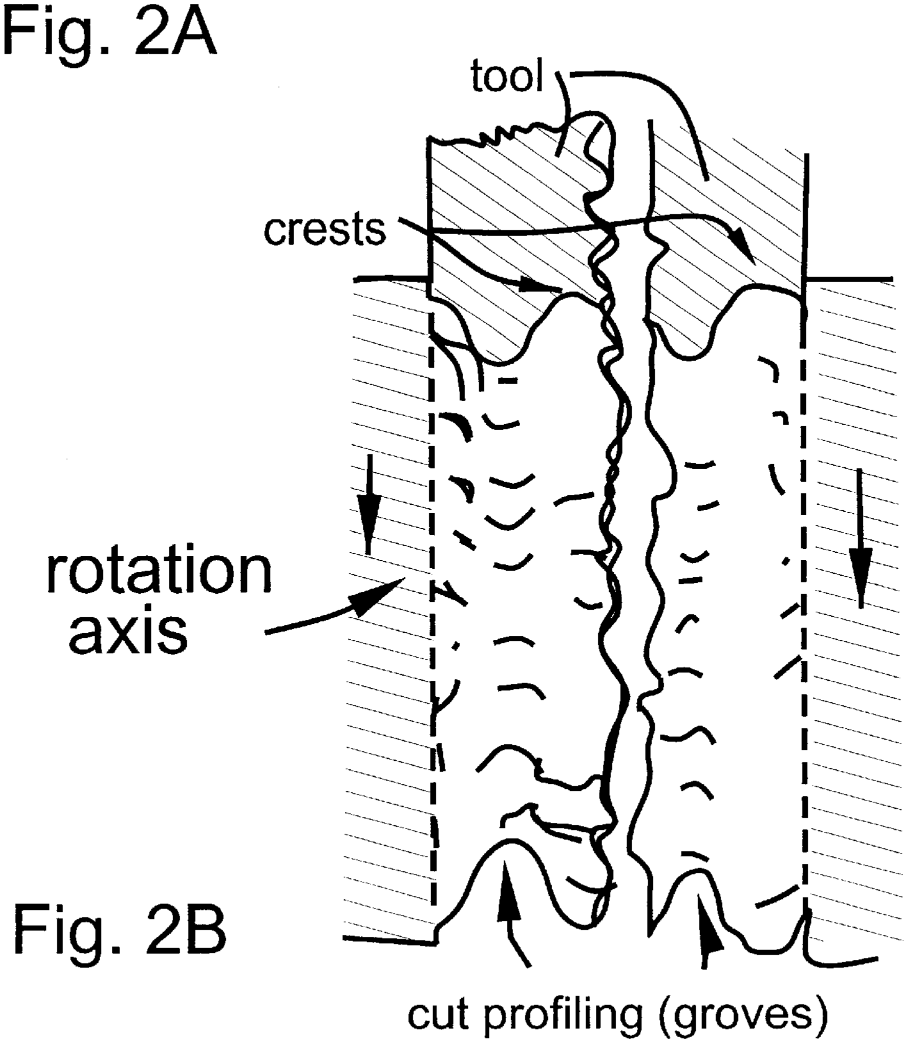
FIG. 2B shows the tool of FIG. 2A in position during cutting the profile, which in this figure is rotated in, for example a lathe, as indicated by the arrows.

Such grooving could be imparted to the substrates by optional means, as for example by machining with special cutters as clarified in FIGS. 2A and 2B.

By way of numerical example, the foils might be 20 $\mu$m thick and run parallel to a grooving of 60 $\mu$m spacing, with a 45 $\mu$m depth from crest to valley. Geometrically, in general, the expected contact spot density will be proportional to the "effective packing fraction" on account of foil thickness and directional cosine of the brush's angle of attack. E.g. a near–100% actual foil packing fraction at 30° angle of attack would yield an effective packing fraction of 50%. In this example, then, the discussed 20 $\mu$m thick foils run at 30° on a grooving of 60 $\mu$m lateral periodicity (of arbitrary profile, one may add) would ideally yield $0.5(\frac{1}{2}\times 10^{-3})(\frac{1}{6}\times 10^{-3})\text{cm}^{-2}=4.2\times 10^{4}/\text{cm}^2$ contact spot density.

This result is about five times higher than the already cited contact spot density of a fiber brush made with the typical 50 $\mu$m diameter fibers at 15% packing fraction and expected one contact spot per fiber end. Consequently based on eq.11, $p_{trans}$, the critical brush pressure at the elastic/plastic contact spot transition would, for same materials, same asperity radius and same area of brush foot print, be five times higher for the foil brush on account of $n^*$ alone to which would be added whatever advantage one designs into the profiling to achieve a large $r_c$. This, then, would permit the use of the correspondingly higher brush pressures if desired, thereby simplifying brush holder design and retrofitting. Correspondingly, also, the brush resistance $R_B$ would, at same β-value and hence same expected dimensionless wear rate, be only one fifth as large as for the typical fiber brush. In the above example one could therefore increase the brush pressure, decrease the wear rate, increase the current density and/or decrease the total brush loss in any desired combinations.

A critical point here is whether the wearing-in will indeed yield the intended $r_c$ values. Moreover, it has already been established (see ref. 6) that too low local pressures will cause a strongly rising value of $\sigma_F$, i.e. the goal of almost indefinitely lowered brush resistances envisioned in the U.S. patent of 1982 [17] is illusory. There will therefore be some optimum density and shape of contact spots which will have to be established through suitable tests, but a distinct improvement at least in regard to the performance of foil brushes in terms of lowered brush resistance and/or extended wear life due to such contact spot management appears to be virtually certain. And while so far the discussion has centered on foil brushes, also fiber brushes and monolithic brushes can be similarly benefited to which we shall return presently.

In order to achieve the outlined potential benefits of the invention, it will be mandatory to optimize the surface finish of the running surface, i.e., slip ring or commutator bars. Specifically, on a fine microscopic scale the slip ring or commutator bar surfaces should be very smooth, best as of a light-optical metallographic polish and achievable by electropolishing, in order to exhibit as small deviations from the intended pattern of grooving and/or asperities as may be possible. This is for the reason that interlocking at contact spots and hence wear particle formation principally occur at irregularities. Additionally, the substrate should be as hard as possible as may be consistent with an adequately low film resistivity. The reasons here are that, firstly, the substrate needs to retain its profiling for the life-time of the machine and, secondly, because, given smooth surfaces, brush wear rates are expected to decrease with increasing superficial hardness of the slip ring or commutator bars since interlocking becomes more difficult with rising hardness.

c. Choices of Surface Profiling for Different Types of Brush

In accordance with the preceding exposition, the objective of this invention is to produce surface profiles and finishes on surfaces that are adapted to sliding electrical contacts, such that at otherwise same conditions they lead to a reduction of electrical brush resistance and/or wear in any combination. This objective requires different profiles and surface finishes for different brushes (i.e. metal foil, metal fiber, and monolithic graphite brushes) and/or conditions as follows:

The emphasis in the preceding exposition has been on increasing the number of contact spots of foil brushes which without special manipulations are liable to be three per foil. The above numerical example has shown that surface profiling is intrinsically able to raise this number to near $\frac{1}{2}d_f$ or perhaps higher, where $d_f$ is the foil thickness, and thereby to achieve contact spot densities that can on occasion exceed the contact density in present practicable metal fiber brushes. At the present time this means d≅50 $\mu$m fiber diameter and f≅15% packing fraction with substantially all fibers touching the substrate and one contact spot per fiber end. However, at the current state of our knowledge the optimum achievable combination of contact spot density and radius of asperity curvature is not known with any certainty. What we do know is that this optimum depends somewhat on sliding speed since, as already indicated, at too low local pressure and with increasing velocity the film resistivity rises. The reason for this is believed to be two-fold. Firstly, contact spots of brushes may begin to lift off the surface in a process ascribed to "aerodynamical lift". Secondly, and more securely proven experimentally [16,18,19], the previously cited ordinary film resistivity is $\sigma_F=10^{-12}$ Ωm$^2$ and is due to two monomolecular layers of water. These remain at the high local pressure of the contact spots after all excess absorbed moisture, which behaves much like fluid water, is squeezed out. Now the current passes through this insulating about 5 Å thick water layer via electron tunneling. As is well known, electron tunneling resistance rises very steeply with barrier width. Hence retention of even a fractional additional water layer on account of too low local contact spot pressure or too high speed so that there is insufficient time for the water to escape, lets the film resistivity shoot up. The speed effect is thus akin to "water planing".

Since contact spot density, shape and size are controllable through surface profiling in accordance with the present invention, future research will doubtlessly be directed to approach the optimum. At this point the best assumption is that optimally both contact spot spacing and asperity radius of curvature will be comparable with the fiber diameter d or foil thickness $d_f$ for fiber and foil brushes, respectively, although one will try to reduce the spacing and increase the curvature. In regard to contact spot spacing this is so because for same β, i.e. same fraction of local pressure relative to the hardness of the brush material, and hence for same wear rate, the electrical brush resistance is inversely proportional to the number of contact spots. And in regard to radius of curvature this is so because at same number of contact spots and same applied brush force an increase of asperity radius of curvature decreases the local pressure, and hence β and with it the wear rate (compare eq. 10).

Optimally, then, one wishes to combine as large a contact spot radius, $r_c$, i.e. in the present invention radius of curvature normal to the average substrate surface, with as close spacing between the contact spots as possible and compatible with freedom from "aerodynamical lift" and/or "water planing". At the same time one will make the amplitude distance between valleys and crests as large as possible so that contact spots remain separate and do not simply merge into a few large contact spots. That these goals are mutually antagonistic is clear from considering the two extremes together with the sought after ideal condition as follows.

Case 1: Two mated absolutely flat surfaces would ideally yield perfect mechanical contact over the whole macroscopic area, at a uniform local pressure equal to the macroscopically applied pressure. This ideal situation, in which electrical contact resistance would be essentially eliminated barring insulating surface films, is intrinsically unstable. Namely, any accidental local pressure increase will concentrate friction heat and cause local thermal expansion. The ensuing "thermal mounding", if significant, relieves the pressure in the vicinity of the evolving mound which in turn increases the local pressure thereby more strongly relieving the pressure in its vicinity on to local separation of the surfaces about the mound. Thereby the thermal mound has been converted into a contact spot which further concentrates not only friction heat but now also the current and, hence, local Joule heat generation. The end result of this cycle of instability due to self-excited thermal mounding is a few large contact spots, and in the extreme limit just one large contact spot (compare ref. 20). Still, this instability becomes important only at significant local heating. More typically, in sliding contacts the number of contact spots ranges about ten.

Case 2: A soft brush material sliding across a hard substrate studded with densely spaced. sharply peaked asperities. In this case the friction coefficient as well as wear are liable to be unacceptably large since the spikes would essentially plow through the brush material, admittedly at negligible electrical contact resistance but probably high friction and definitely high wear rate.

Case 3: A relatively hard substrate material shaped with intermediate asperity radii in accordance with the present invention and mated with a softer or at most equally hard brush material, will form a number of contact spots equal to the number of asperities within the interfacial area, provided the spots are not too closely spaced so as to merge and cause thermal mounding. The essential characteristic is therefore that under elastic loading, isolated contact spots will form that are separated by regions not in load-bearing contact. This requires a sufficient depth of the profiling. At the same time, and as already explained, as large asperity radii as compatible with the highest number of separate contact spots and still adequate local pressure is desirable since at given macroscopic brush pressure this increases $p_{trans}$. In the case of grooving in conjunction with foil and fiber brushes, the spacing of the contact spots in sliding direction is self-limiting to the foil diameter and to the fiber diameter, respectively, regardless of the shape of the substrate. Correspondingly the contact spots will not have radial symmetry but exhibit different asperity radii in different direction, and the above considerations apply only to the lateral profile of the grooving. In either case, given the contact spot density and average radius of curvature, the equations previously derived for fiber brushes apply appropriately since they depend only on the density and asperity radius of curvature [4–6]. Hence for β below unity the local pressure at the contact spots will fall below the (Meyer) impression hardness of the softer side, the more so the larger the asperity radius. The estimate for the optimal asperity radius as well as average asperity spacing as generally comparable with the foil diameter, and similarly for the depth and spacing of grooves, is thereby justified, but detailed experiments will be needed to locate the optimum conditions from case to case. Herein the shape of isolated asperities is of minor importance except that elongated contact spots will be more resistant against "aerodynamical lift" or "water planing" and therefore desirable.

Case 4: Elastically flattened contact spots. As to the limits on cross-sectional shapes of the profiles, begin by considering a prismatic sinusoidal shape, i.e.

$$u=A\ \sin(2\pi/\lambda)x. \tag{12}$$

as in FIG. 1A. On a substrate of Young's modulus E, that profile will be flattened by pressure [21]

$$p_A=\pi EA/\lambda \tag{13}$$

Figure 1B:
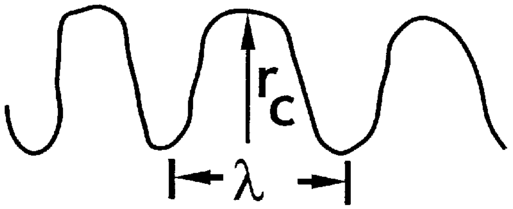

For the choice of $\lambda=A=d_f$, the permissible pressure before contact spots centered on the crests of a sine-wave profile would merge is therefore, with a hardness of $H\cong 0.004$ E in accordance with eq.4, $$P_{A,A=\lambda}=\pi E\cong(\pi/0.004)H\cong 800H \tag{14}$$

i.e. very much larger than any conceivable local contact spot pressure. And even less liable to be flattened would be a profile with the same period and amplitude but crests that are flatter than according to a sine function. This modification of the profile, indicated in FIG. 1B, is desirable because the curvature at the crests of a sinusoidal profile, which determines the asperity curvature $r_c$ is $$(d^2u/dx^2)_{x=\lambda/4}=A(2\pi/\lambda)^2 \tag{15a}$$

yielding a local radius of curvature for $\lambda=A=d$ (or $d_f$, respectively), of $$r_{cA}=\lambda^2/2\pi A=0.16\ d \tag{15b}$$

This is significantly smaller than the desired radius of curvature, namely $r_{cA}>\cong 0.5$ d in accordance with eq.3. It follows that the profile of grooves (and by inference of isolated asperities) should be flattened at the crests compared to a sine function, as indicated in FIG. 1B.

Figure 1C:
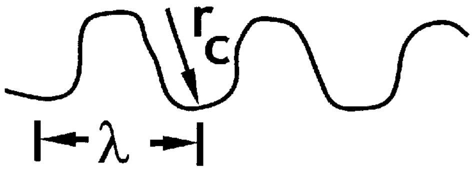

The above discussion will have made it clear that all types of brushes, including also traditional monolithic brushes, can benefit from surface shaping in accordance with the present invention, but with a few adaptations dependent on which brush type is concerned. For foil brushes, in particular, grooves would seem to be the more advantageous than isolated asperities, not only because they are liable to confer resistance against aerodynamical lift and/or water planing but also because the foils will gradually wear into profiles that mirror the grooving so that the grooves will guide the foils and maintain steady contact spots. The considerations on asperity radii therefore suggest that for foil brushes both crests and troughs should be flattened, as shown in FIG. 1C.

Figure 1D:

In similarly using grooves for guiding the fiber ends of fiber brushes, these should be moderately wider than the fiber diameter and be flattened at the bottoms where $r_c$, is determined. However, in order to keep the fibers from escaping from the grooves as well as to keep them as closely spaced as possible, the crests of grooves intended for use with fiber brushes should be made as narrow as possible, resulting in profiles as indicated in FIG. 1D.

Figure 1E:
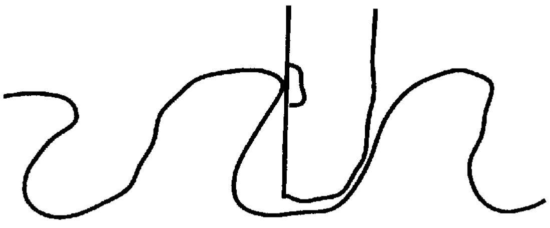

Pending experiments to determine the issue definitely, overhangs in isolated asperities as well as in grooves, e.g. as depicted in FIG. 1E, should be avoided. Firstly, in conjunction with all types of brushes, including traditional graphite or metal graphite brushes, overhangs will be prone to catch wear debris which is almost certain to cause extra wear. Secondly, in conjunction with metal fiber brushes the top lips of the overhangs will cause wear at the sides of fibers (see FIG. 1E).

As will be explained presently, the use of isolated asperities is severely restricted on account of limited permissible substrate slopes in the direction of sliding. If they are used, alone or simultaneously with grooves, they should best, although not necessarily, be more closely spaced than the average foil thickness, $d_f$, or fiber diameter, d, in conjunction with foil and fiber brushes, respectively. In conjunction with monolithic graphite or metal graphite brushes, the optimal asperity spacing is expected to be considerably larger but should still be such as to increase the contact spot density from the ordinarily typical ten to a thousand or so, thereby essentially eliminating the constriction resistance [4–6].

Figure 3A:
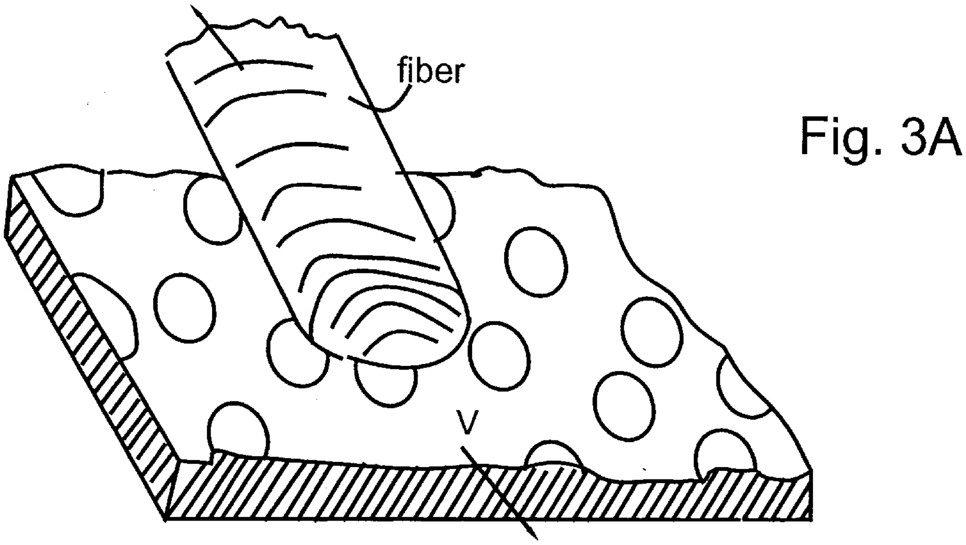
FIG. 3A shows a fiber end encountering isolated flat asperities of closely similar elevation so as to form, in this case, four separate contact spots.
Figure 3B:
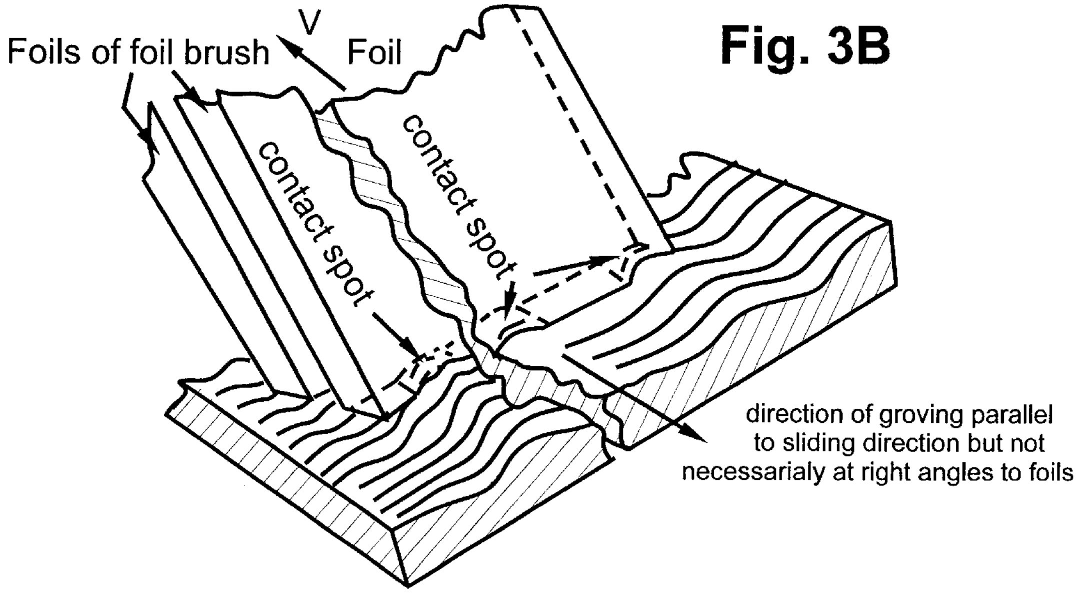
FIG. 3B shows the situation comparable to FIG. 3A but for the case of foils instead of fibers and sliding on grooving instead of isolated asperities.

The anticipated benefits of small spacings of isolated asperities in sliding direction, in the case of foil and fiber brushes, are (i) to obtain the highest possible contact spot density and (ii) to prevent vibrations normal to the interface of an amplitude comparable to the average elevation of the asperity crests above the surface outside of the asperities as, say, the foils or fiber ends encounter asperities singly. All vibrations, and certainly those under discussion, raise the wear rate as they cause momentary elevations of the local pressure, i.e. of the momentary effective local value of β. Thus in the case of fiber brushes with d=50 μm fiber diameter, the average asperity spacing in sliding direction should be about 25 μm or less to generate at least two contact spots on the average fiber end and prevent the discussed vibrations as indicated in FIGS. 3A and 3B. Again, future research will reveal the optimum choices for the asperity spacing in different conditions. Similarly also to be determined through future research are optimal shapes of asperities, and thus contact spots, namely preferably elongated in sliding direction so as to reduce the rise of brush resistance with sliding speed due to "aerodynamical lift" or "water planing", that has already been introduced above.

Conditions are expected to be by far less demanding in conjunction with traditional monolithic graphite or metal-graphite brushes. These, too, will benefit from an increased number of contact spots since, as already mentioned, that will permit essential elimination of the constriction resistance which typically amounts to about one third of the total brush resistance. Additionally the wear rate is expected to be improved by means of profiled substrates in accordance with the present invention, namely through diminishing opportunities for wear chip formation (compare ref. 22).

d. Surface Finish

The quality of the surface finish of substrates constructed in accordance with the present invention is similarly important, for monolithic, fiber and foil brushes, as the shape of the profiling. This has three aspects: (i) Microscopic smoothness, (ii) hardness and (iii) resistance against oxidation and other chemical attack including corrosion. To discuss these in turn:

(i) In order to minimize wear (and presumably also the coefficient of friction), the surface finish ought to be as microscopically smooth as possible, as was already mentioned above. Such microscopically smooth finishes prevent microscopic interlocking at contact spots which generates wear particles. An obvious method for achieving the desired high smoothness on a microscopic scale is mechanical polishing, such as buffing with a soft textile cloth, felt or plush, or with chamois leather, most typically in conjunction with some polishing agent, e.g. alumina or diamond powder. Alternatively, electrolytic polishing may be used. However, any such smoothing may give rise to nano-sized unseen layers of high electrical resistance. If this occurs these have to be removed before use, e.g. through electrolysis or through annealing in a protective or reducing atmosphere such as argon, $CO_2$ or hydrogen, with or without moisture addition, as practical experience will indicate.

(ii) While low wear rates of the brushes is highly desirable, in practice virtually no wear of the substrate can be tolerated. This is a well-known requirement for the ordinary substrates (i.e. not deliberately profiled slip rings and commutator bars in electric machinery) but it is even more essential for profiled substrates in accordance with the invention; otherwise their profiling, i.e. groovings and/or isolated asperities, that will typically be only up to a few tens of micrometers high, will be worn off. This means that the profiled surfaces have either to be made of an intrinsically harder material than the low-concentration copper alloys normally used for slip rings and commutator bars, e.g. of stainless steel or nickel or brass or titanium or other suitable metal, or that the surface be plated with a thin hard layer, or both. A diamond-like coating has already been developed for this purpose under sponsorship of the Annapolis Navy laboratory. However, recent tests on this coating in our laboratory have been very disappointing, partly for the reason that the diamond-like coating is composed of small particles which can be readily dislodged, and partly because of a much too high intrinsic electrical resistivity. What is needed, instead, is a locally very smooth, hard surface finish of a conductive material. In accordance with the present invention, the desired surface finish can be made of TiN (titanium nitride) or related metal nitrides (e.g. zirconium nitride or chromium nitride) which are characterized by their bright metallic gold luster. These are increasingly used on cutting tools, such as drill bits, which testifies to their great hardness as well as tenacity under severe wear conditions, both of these essential properties for the intended use on electrical brush substrates. Note here that the metallic luster of these platings is due to conduction electrons and thus is a token of their intrinsic high electric conductivity. By contrast, diamond-like coatings, while very hard, tend to be transparent since they lack conduction electrons. Correspondingly diamond coatings, even if heavily implanted with charge carriers, tend to have poor or no intrinsic electrical conductivity, thereby making them unsuitable on substrates for electrical brushes. However, preliminary experiments have revealed a tendency of TiN (and by inference similar coatings) to form an invisible oxidized surface layer of an unacceptably high electrical resistivity that preclude their use in the open atmosphere. It is expected that such surface layer formation can be prevented by the use of a reducing protective atmosphere, such as hydrogen.

Depending on current density, speed and permissible resistance, it would be advantageous also to coat foil and fiber brushes (but not monolithic brushes) with a metal nitride or other similarly hard platings with metallic electrical conductivity, including the foil or fiber ends, as applicable. This should confer virtually zero wear, admittedly at some penalty of brush resistance at same brush pressure.

However, the brush force could be increased to lower the brush resistance appropriately, and there might well not even be a penalty in terms of friction heat on account of the expected lowered friction coefficient.

(iii) Corrosion and oxidation resistance is desired so as to be able to operate the brush-substrate combination in the open atmosphere. The discussed metal-nitride platings are produced at elevated temperatures (typically at and above 500° C.), and exhibit the desired high chemical stability in addition to hardness and electrical conductivity. It is for this reason that bathroom fixtures plated with metal nitride have been nationally advertised with a life-time guarantee against tarnishing and corrosion, specifically by the Moen Company. Even so, the already discussed invisible insulating surface films on TiN and similarly other corrosion resistant hard materials such as stainless steel, chromium and nickel, preclude the successful use of such coatings in the open atmosphere, as already indicated.

This leaves various other coatings and surface modifications that can be suitable for profiled brush substrates in the open atmosphere, namely composed of noble metals. Specifically, rhodium platings are very hard and resistant against oxidization. Similarly iridium, platinum and other platinum group metals are expected to offer the same advantages of hardness and resistance to chemical attack. Specialized electrolytic plating solutions are available for at least some of these and others will presumably become available once a demand arises. While by far softer than the already mentioned noble metals, hard gold platings are harder than copper, have good wear resistance and can be used in the open atmosphere. They have their advantages also in protective atmospheres. Similarly other intrinsically softer platings can be use-ful, including silver on copper fibers or foils, for example, as well as very thin graphite coatings whether of layer-type or colloidal graphite. Finally, according to a recent press report, active research is in progress at one of the Fraunhofer Institutes in Germany towards the development of diamond-like graphite coatings, albeit no details could as yet be ascertained. Such coatings are liable to be very attractive for the discussed purpose once they should become available. The present invention therefore is not meant to rule out the use of these or indeed any other plating or coating on profiled substrates as may be suitable. And, again, except as already indicated, all three types of electrical brush can benefit from the different discussed types of surface coating and polishing, at least on the side of the substrate.

e. Brushes With "Support Fibers" or "Support Foils". Foil Brushes Run in Arbitrary Orientations, Hybrid Brushes and Brushes with "Lightning Rods"

Figure 4A:
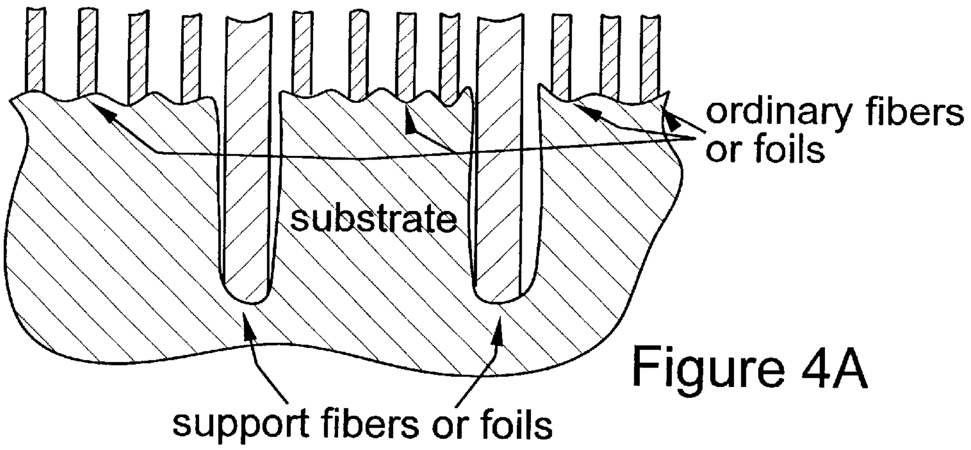
FIGS. 4A–4F show schematic views of sections through different brushes, all except the foil brush in FIG. 4D including more than one type of fiber or foil, in position relative to substrate profilings adapted to them, except in FIG. 4E where the substrate is not shown.

In the preceding considerations, the objective has been to configure the substrate so as to obtain an increase in contact spot density and/or optimal contact spot morphology beyond what would be established automatically by use of the same brushes. In accordance with the invention, the means to this end is the shaping of substrates to provide "built-in" contact spots, either through grooving the substrate or providing it with isolated asperities. In principle, both can be done simultaneously and might be desirable in cases in which foil or fiber brushes comprise elements of two or more different sizes, e.g. "support fibers"[17] (i.e. minority mechanically stiffer fibers whose function is to protect the brush from being crushed) guided by grooves, and finer fibers responsible for most of the electric conduction exposed either to a smooth surface or to asperities between the grooves. This is indicated in FIG. 4A wherein the sliding direction is normal to the plane of the drawing.

Much the same geometry is in principle also applicable to foil brushes, i.e. comprising "support foils" guided in grooves. However, in that case the brush would have to be run parallel to the foils as sketched in FIG. 4B while in the previous considerations foil brushes were thought of as running normal to the sliding direction or to be only moderately inclined to that orientation (e.g. as in FIG. 3B). Independent of selection of the discussed component of foil orientation, in order to obtain elastic compliance in the direction of load application, foil brushes will generally be run modestly or perhaps even strongly slanted against the substrate. That slant will mostly be in the "trailing" sense but can also be "leading" i.e. as if the foil is pushed forward in the manner of a snow-blade and, much like a snow-blade, sweep away wear debris out of its path. This freedom of choice of slant of the foils relative to the plane of the substrate was already implied for foil brushes sliding more or less normal to the lines of contact between the foils and the substrate, and that case yields no new geometry. A different geometry is generated, however, if slanted foils are oriented so that they slide parallel to their line of contact with the substrate. In that case the grooves should be shaped accordingly, e.g. as indicated in FIG. 4C.

Figure 4B:
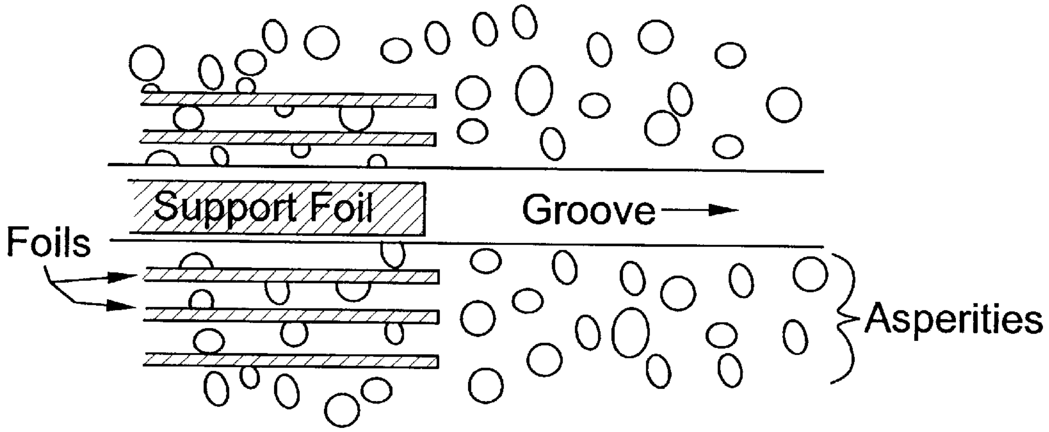
Figure 4C:
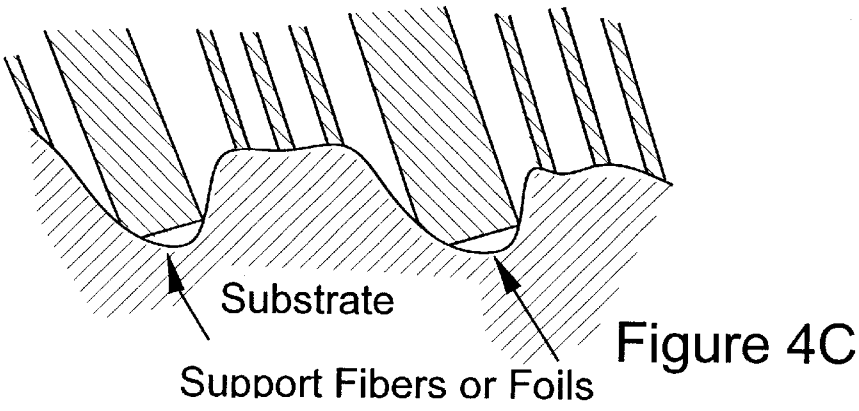
Figure 4D:
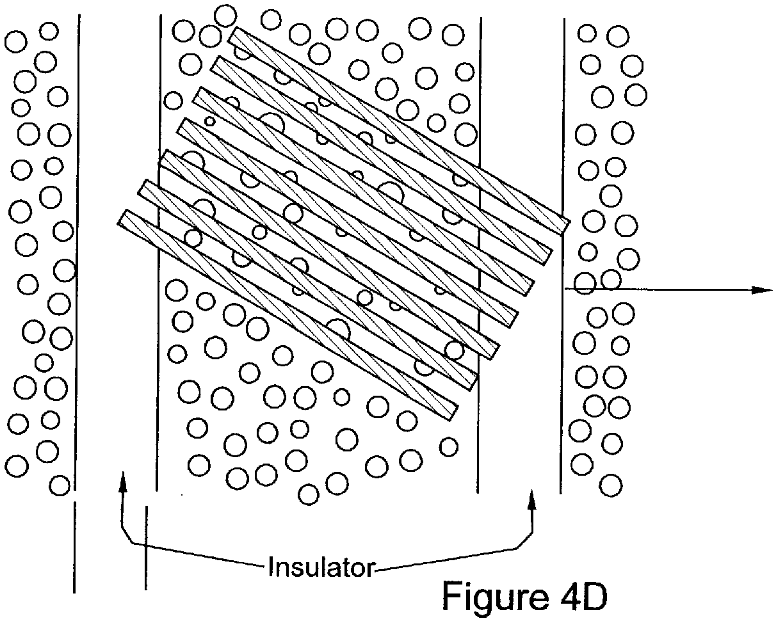
Figure 4E:
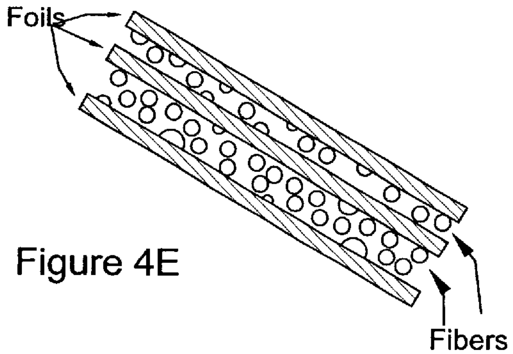
Figure 4F:
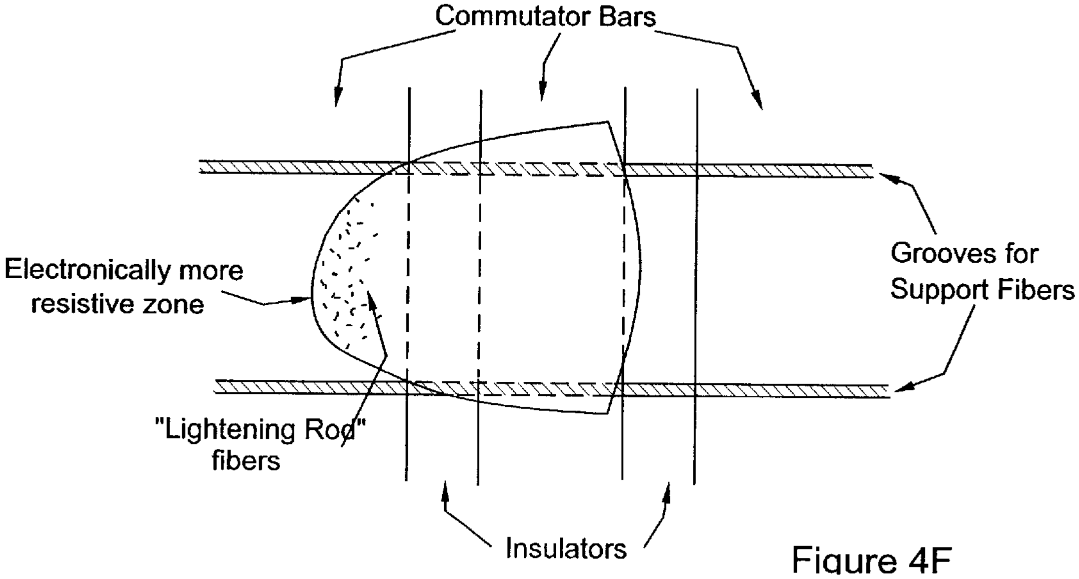

In general, as already suggested, foil brushes may be run at any angle relative to the sliding direction (FIG. 4D) and their overall cross-sectional shape may be selected at will as also indicated in FIGS. 4E and 4F. Further, foils may be teamed with fibers in "hybrid foil-fiber brushes" (FIG. 4E). Independent of these options, all of the already discussed considerations regarding sizes and surface finish will apply as before. The discussed possible choices for foil and hybrid foil-fiber brush sliding, illustrated in FIG. 4, could prove most useful in commutating applications. In that case the support foils or fibers could in fact be insulating and simply serve the function of reducing the jarring as the brush crosses the gaps between the commutator bars.

At least some of the fibers in-between the foils (e.g., as shown in FIG. 4E) could be very fine fibers of tungsten or stainless steel or similarly arc-resistant material to serve the function of "lightning rods", i.e., provide preferential sites for arcing, thereby protecting the majority current conducting fibers from arc damage. This introduces yet another type of contact spot. In fact the stratagem of "lightning rod" fibers has already been used successfully with metal fiber brushes were the "lightning rod" fibers were crowded at the trailing ends of the brushes as indicated in FIG. 4F.

Not only are the outlined possibilities broadly applicable to fiber as well as to foil and hybrid foil-fiber brushes of arbitrary shapes and sizes and independent of orientation to the sliding direction, as may be best suited to the specific operating conditions, but additionally the individual fiber and foil shapes can be varied as indicated in FIG. 4. For example, foils could be dimpled or corrugated in a regular or irregular manner; in the case of corrugations, the not necessarily straight crests could be oriented in any desired manner relative to the intersection line between foil and substrate. Herein one's freedom of choice is somewhat restricted by the need for relatively easy sliding between neighboring foils so that the brush as a whole does not become too hard. On the other hand a certain degree of foil brush stiffness in selected directions may be desired so as to resist Lorentz forces on account of the sometimes large magnetic field strengths within a motor. And similarly, at same overall packing fraction the stiffness of the individual fiber can be somewhat regulated, as a function of orientation relative to the sliding direction via its cross-sectional shape, e.g. tubular or flattened to various degrees, including shapes that are intermediate between fibers and foils, with the long axis, say, in the plane containing the sliding direction or at right angles thereto. Several years ago, brushes of that type have been made in the UVA laboratory and their successful testing in the Navy Annapolis Research Laboratory under Dr. Neal A. Sondergaard, showed agreement between theory and experimental data (compare ref. 5).

f. Limitations on Substrate Slopes in Sliding Direction and High Speed Applications While the preceding considerations were mostly aimed at suitable profiling for the formation of asperities in predetermined locations, typically opportunities for slope variations normal to the substrate in sliding direction, and thereby for using isolated asperities, are severely limited, unless the asperities are closely enough spaced that the fiber of foil ends "see" an average surface level as already discussed in connection with FIG. 3A. Specifically there are two conditions in which no or only very mild vibrations of the fiber or foil ends in the direction of sliding can be tolerated. These are "polishing wear" and high-speed brush use. To begin with the former, polishing wear due to fiber brushes was observed from the very start of the development of the metal fiber/metal foil brush technology [13,14]. Namely, after running metal fiber brushes under what appear to be highly favorable conditions in regard to current conduction and wear, with the implication that contact spots were elastic, the (generally harder) substrate is found to have been microscopically smoothed under the wear track, i.e. evidently by the (generally softer) fiber ends of the brushes. The same phenomenon of polishing through sliding was also observed in connection with fiber bundles tested in the so-called "Hoop Apparatus [23]". It thus stands to reason that for particularly low wear rates one will wish to simulate "polishing wear" through the use of highly polished very smooth substrates. The instability due to thermal mounding discussed above in the section "Choices of Surface Profiling" is unlikely to occur thereby on account of the low power density dissipated by the brushes even up to high current densities. However, in order to stabilize the situation, any of the hard platings already introduced, will extend the range of current densities in this regime provided they exhibit low film resistivities.

In high speed brush operation, a much more restrictive condition applies to both, isolated asperities as well as relatively long-wavelength surface waviness. The result of violating this restriction is not only brush resistance increase on account of "aerodynamic lift" alias "water planing" already discussed, but brush or fiber/foil bouncing and local arcing, as the ability of the contact spots to mechanically track the substrate waviness is exceeded. Namely, the individual fiber end or foil section, respectively, has its own characteristic vibration frequency, and it cannot track surface undulations which pass by at a higher frequency. For the case of metal fiber brushes this syndrome has been theoretically examined in ref.6, section 20.11.1 "Properties of Brush Bodies and Continuous Wear of Brushes." It was found that for ½" long sections of d=50 μm copper fibers, full tracking of fiber ends with elastic contact spots at speed $v_{max}$ is possible only if, Ψ°, the angle of surface inclination of the substrate in sliding direction, is limited to $$3.6°[\text{m/sec}]/\Psi° \leq v_{max} \leq 89.4°[\text{m/sec}]/\Psi° \quad (16)$$

with $v_{max}$ in meters per second, depending on numerical assumptions made. Thus for a desired speed of $v_{max}$=150 m/sec, as would be applicable to future maglev (magnetically levitated) trains, the maximum slope of the substrate in sliding direction which still permits full tracking with elastic fibers and contact spots, lies between 0.024° and 0.60°. Evidently, then, the opportunities for preformed isolated asperities which do not form multiple contact spots per fiber end as in FIG. 3A (and similarly foil section) are severely limited e.g. even for the middle value of $$\Psi° \approx 45°/v_{max} \quad (17)$$

with again $v_{max}$ in [m/s], a 10° slope cannot be tracked above 4.5 m/sec.

This limitation, i.e. that truly isolated asperities which are too strongly sloped will give rise to fiber bouncing (and similarly local foil bouncing) and thus will give rise to potentially disastrous arcing, will have to be kept in mind when designing substrate patterns. The critical values depend, of course, on the desired speed, say anywhere between 3 m/sec and 300 m/sec (compare the already cited section in ref.6). They also depend on choice of fiber or foil material and average free fiber or foil length, rising with stiffer fibers and foils and decreasing with shorter free foil or fiber lengths. Reasonable limits on permissible local deviations of the substrate surface from strict planarity correspondingly vary from case to case and range from, say, 0.01° to 20° slope variations in sliding direction. Fortunately, substrate slopes normal to sliding direction and thus grooving profiles are not similarly limited. In fact, even in sliding direction, grooving is liable to perform much more satisfactorily in this regard than isolated asperities and to permit wider limits on local deviations of slope in sliding direction. However, unless grooves are very shallow, the axial deviation of grooves is similarly limited so as not to let fiber ends or worn-in foil profiles jump their respective grooves, namely to a provisionally estimated value of $2d_f$ or $2d$, respectively.

The above considerations lead to the conclusion that very nearly flat substrates, perhaps including a grooving in sliding direction, may be optimal for high speed brush operation, whereas rather wide deviations of slope in sliding direction, are permissible at low speeds. Moreover, and in order to let any of these more or less flat substrates perform best, a hard plating such as already discussed above, will be invaluable.

g. Application to Heat Transfer and to Electrical Switches

The invention is applicable to heat transfer in the same manner as to current transfer, and to electrical switches as to sliding electrical contacts. Physically, electrical and heat conduction rise and fall together on account of the Wiedemann-Franz law (compare ref. 2).

h. Cross-sectional Shapes and Construction of Brushes Adapted to Commutation

Commutation generally raises the wear rates of brushes by about a factor of two but may be relatively more detrimental to metal fiber brushes [24,25]. This is partly due to the mechanical fatiguing caused by the high-frequency jarring and thus momentary pressure increases at transitions between bars and insulators or, worse, air gaps. Such jarring can be largely eliminated through filling the gaps with insulating material at as nearly smooth surface leveling between bars and insulators as may be possible. Additionally it is believed that the jarring can be reduced by the use of support foils, especially when guided in continuous grooves as suggested in FIGS. 4B and 4F.

In view of the arcing at trailing ends of brushes, to be discussed next, such support foils need not necessarily be electrically conductive. Namely, the more important and less tractable part of extra wear in commutation arises from arcing due to rapid current density changes. Such arcing is mostly concentrated at the trailing edge of brushes but according to recent observations in our laboratory can have a minor component also at the leading brush edge, namely on account of "current closing" as the leading edge of the brush makes first contact with the next commutator bar. The described arcing damages monolithic brushes through eroding away brush material. This causes the roughly doubling of the wear rate through commutation observed for monolithic brushes, already mentioned. However, local arcing is much more detrimental to fiber brushes than it is to monolithic brushes. According to present best knowledge, this is so because local arcing at any particular fiber end tends to melt it and the cooling and solidifying melt has a certain probability to fuse the directly affected fiber to one or more neighbor fibers. The probability of the thereby somewhat stiffened fiber group to be subject to arcing and the repetition of the process is increased, so that more fibers fuse into the group. In any event, in regard to contact spot densities the stiff, fused fiber groupings will act like a single fiber with one or a very few contact spots, and these contact spots in the plastic state. The end-result is a characteristic "leopard skin patterning" of fused groups of fiber ends separated by zones of relatively undamaged fibers in a morphology resembling the spots on a leopard's fur. In addition to the outlined microscopic damage to the fiber brush, macroscopically the brush is strongly mechanically hardened on account of leopard skinning, will increasingly begin to bounce and in consequence be subject to even more arcing.

Besides electrical engineering measures, such as the use of capacitances and diodes, three distinct options exist to ameliorate arc damage in the course of commutation that may be used singly or in combination. Firstly, adaptations of overall brush shape and construction such as suggested in FIGS. 4D to 4F to reduce arcing and/or its effects on fiber or foil brushes. Secondly, permit the brush to wear so rapidly that incipient leopard spot damage is removed as fast as it is generated and thereby prevent it from becoming established. This fast-wear condition occurs at wear rates characteristic for plastic contact spots, i.e. in the $10^{-9}$ dimensionless wear range or faster. The data in refs. 24 and 25 belong into this regime. However, such wear rates, even though they lead to sustainable fiber brush performance without dramatic deterioration, are generally not tolerable in electrical machinery. Third, and most promisingly, construct fibers so as not to melt and/or fuse at the tips even is arcing occurs.

This last condition may be achieved with fibers of high melting temperatures, e.g. made of refractory bcc metals, foremost tungsten which is known to be a highly arc resistant metal. However, the contact resistance of arc-resistant metals is liable to be prohibitively high on account of oxide formation. It is therefore proposed to use such fibers but coated with the same materials, e.g. rhodium or hard gold plate in the open air or metal nitrides in protective atmospheres, that are also suggested for substrate hardening. Alternatively and still more promising is the proposed use of more common metal fibers, e.g, of copper, silver, gold and their alloys, which are protected with noble metal platings, especially with metals from the platinum group. The choices of platinum and rhodium are foremost among such coatings, that could be deposited electrolytically. And lastly specialized graphite coatings of the kind currently being developed may serve the same purpose in the future. The anticipated effect of such coatings is that they will be too thin to give rise to significant melt droplets themselves, thus to inhibit melting and fusing together of fiber ends beyond what may be expected of the uncoated fibers, and to do so at low levels of electrical resistance. It is anticipated that this invention will thus keep the contact spots at fiber ends separate even under rather severe conditions and thereby permit the widespread use of metal fiber brushes in commutation. Much the same considerations also apply to foil brushes, and in ref. 3 a number of observations on arcing have already been documented.

In line with FIG. 4 and the preceding paragraph the different stratagems to combat arcing through the management of contact spots already developed for metal foil brushes, as further explained below, can be used also with foil brushes, and to some extent more easily. Specifically, the following three stratagems for arc suppression have already been tried and been found helpful: First and foremost changes in the cross-sectional shapes of brushes, and thereby of the overall distribution of contact spots. Namely, rather than letting the leading and/or trailing edges be parallel with the commutator bar edges, thereby turning on and off the current very abruptly and uncontrollably over the whole width of the brush, it can be advantageous to shape the cross-section for a more gradual rate of change of contact spots per bar, such as indicated in FIGS. 4D–F. The examples of FIGS. 4D–4F are not meant to be exhaustive but rather to give general indications. Specifically, any one edge may exhibit one or more extra corners, they may include sharp peaks or cusps and they may be composed of straight and curved sections in any combination. At this point we know that the shapes indicated in FIGS. 4D–4F are helpful. No doubt in the future other shapes will be found to be equally good and better, but in any event depend on the more controlled and gradual change of contact spot numbers and distribution per commutator bar. However, for success of this method, the lateral (or "cross") resistance within the brush should be adequately high. For copper fiber brushes a controllable cross resistance can be imparted by very simply heating in air. Say, twenty minutes heating in air at 130° C. may yield a few ohms of cross resistance in a 1 $cm^2$ brush. This is also important for inhibiting circulatory/eddy currents that can waste energy in the presence of strong magnetic fields.

Second, one may gradually increase the intrinsic brush resistance, i.e., in terms of unit area or brush working surface on a small scale, towards the trailing end. The efficacy of this principle appears to be common knowledge and has been known to this inventor for the past two decades. In the case of foil and fiber brushes putting such control into practice depends on the density, morphology and distribution of the contact spots, and the current paths from them through the brush and beyond. For example, commutator bar surfaces could be shaped with a decreased density and/or changed morphology towards the leading and/or trailing edge. One may also effect the desired gradient of brush resistance in sliding direction by the use of fibers and/or foils of different electrical resistivity, or else by a resistance gradient in the brush back-plate. In our laboratory an electrically more resistive zone as indicated in FIG. 4, in that particular case consisting of a graphite fiber felt, has been found to be effective.

Third, by the incorporation of especially fine fibers of an arc resistant metal, as shown in FIG. 4F, which serve as a kind of lightning rod, small arcs can be deflected from the majority, current-conducting fibers and similarly foils. Like the principle of actual lightning rods, this effect depends on the increase of electrical filed strength near surfaces of high local curvature and providing a current path along which the energy can be harmlessly dissipated. The already indicated plating with a hard, metallically conductive coating can be use in conjunction with any of the discussed stratagems.

i. Combating the Effect of Uncontrolled Magnetic Forces on Foil and Fiber Brushes Especially in machines with super-conducting magnets, the brushes may be subject to strong magnetic fields which act with the corresponding Lorentz forces on the current-carrying fine brush elements, i.e. the individual fibers or foils. Those magnetic fields vary with the mode of operation of the machine, i.e. are not simply constant, and they add to or subtract from the deliberately applied mechanical brush force.

It is herewith proposed to combat this problem somewhat by deliberately increasing the applied brush pressures. In conjunction with pure copper or silver fibers, this is not feasible on account of, say, eq.4, since H is a relatively low number and β must remain below unity. However, by the use of, say, rhodium fibers on a hard substrate, the permissible brush pressure may be considerably increased, perhaps by as much as a factor of five or even more. Thereby the Lorentz forces will become relatively smaller compared to the deliberately applied brush force and thereby the problem of their variability be decreased.

A penalty of this option is, of course, the correspondingly increased friction force. This might not be an insurmountable problem, though, since typically friction losses lie considerably below Joule heat losses and, moreover, there is a realistic hope that the proposed highly polished hard-coated surfaces have an intrinsic lower coefficient of friction ($\mu$) than the standard roughly 0.3 which is characteristic for the double-molecular layer of adsorbed moisture between the two sides of contact spots that was already introduced in the "Background Art" section. Much more importantly yet, there exists a theoretically predicted condition in which the desired higher brush pressures, so as to overcome the effect of erratic Lorentz forces, is combined with decreased friction and expected virtually wear-less brush operation, as outlined in the next section.

j. Low-Friction/Low-Wear Brush Operation at High Brush Pressures

The electrical fiber brush resistance, $R_B$, is almost totally due to the unavoidable surface film that separates the two sides, with a specific resistance of $\sigma_F$. As already discussed below, for well-functioning fiber brushes, operated in the traditional manner, the film resistance is due to adsorbed moisture and has the value of $\sigma_F=10^{-12}\ \Omega m^2$. Following refs.5 and 6, it is, for a brush "footprint" $A_B$, $$R_BA_B=(\sigma_F/K^2)\{(E/p_B)^2(d/r_c)^2/(70\alpha f)\}^{1/3} \quad (18)$$

were $K^2>1$ is a factor not far from unity which takes account of "peripheral" electron tunneling about contact spots [5,6, 14] which will be neglected. By the use of a more accurate expression for $p_{trans}$ than eq.1, extracted from ref. 6, this may be rewritten $$R_BA_B\approx 870\ \sigma_F(d/r_c)^2/(\beta^{2/3}\alpha f) \quad (19)$$

Furthermore, $\beta=\frac{1}{2}$ is accepted as an upper limit compatible with long wear life.

In past treatments, as already mentioned, $d/r_c$ was assumed to be 2, in agreement with empirical observation. The traditional use of metal fiber brushes is determined by this assumption since it limits $p_{trans}$ to the value of eq. 1 instead of the potentially larger values of eq.10 when $r_c$ is larger than the fiber radius, d/2. If we may, then, call the traditional use of fiber brushes the "standard" case, signified by a subscript "Ast", with $(r_c/d)_{st}=\frac{1}{2}$ and $\beta_{st}=\frac{1}{2}$, then for otherwise the same brush but deliberately chosen $r_c/d$ and a variable β value, designated by the symbol $\beta_{select}$, we find $$\begin{aligned} R_BA_B/(R_BA_B)_{st} &= (\sigma_F/10^{-12}\Omega m^2)(d/r_c)^2(1/2\beta_{select})^{2/3}/4 \quad (20)\\ &= 0.157(\sigma_F/10^{-12}\Omega m^2)(d/r_c)^2(1/\beta_{select})^{2/3} \end{aligned}$$

or with eq.4

$$\begin{aligned} R_BA_B/(R_BA_B)_{st} &= 0.157(\sigma_F/10^{-12}\Omega m^2)(d/r_c)^2(H/_{el}\,p_{select})^2 \quad (21)\\ &= 2.52\times10^{-6}(\sigma_F/10^{-12}\Omega m^2)(d/r_c)^2(E/_{el}\,p_{select})^2 \end{aligned}$$

At this point it is important to realize that both the coefficient of friction as well as the film resistivity become strong functions of the local contact spot pressure once it decreases below the level at which all but two monomolecular layers of water are squeezed out from between the contact spots. This, then, opens a window of opportunity for the almost wear-less operation of fiber (or foil) brushes. Namely, the resistance, $R_b$, of a fiber brush is essentially that of the film separating the two sides of the contact spots, i.e. typically the already discussed adsorbed water layer. Mainly for this reason, in a long series of papers, the basic properties of adsorbed moisture have been clarified as summarized in refs. 5 and 6. Its behavior is surprisingly similar to that of liquid water.

With increasing pressure between the two sides of a contact spot the water is squeezed out, initially like any ordinary fluid, and at pressures typical for ordinary contact spots to two mono-layers of ~5 Å thickness total, whose coefficient of friction is near 0.3, as already outlined in section (c). However, at greater film thicknesses the water increasingly acts like a lubricant and, as we know from sliding on ice, friction falls to about 1% to 2% at an estimated 1 nm film thickness.

The precipitous decrease of friction with water layer thickness above two monolayers between contact spots gives rise to loss of control of cars in heavy rains, and to the slipperiness of wet floors, especially with rubber-soled shoes whose hardness is too low as to expel the water down to the discussed two monolayers. Similarly, also, at contact spots excess water molecules are trapped between the two monolayers at high speeds, almost as if the contact spots began to water-plane and friction decreases. Further, at otherwise same conditions, the concentration of "trapped" molecules increases slowly with increasing contact spot size and more rapidly with decreasing contact spot pressure, i.e. decreasing β.

At any thickness, current conduction through the water layers between the contact spots takes place via electron tunneling, with a film resistivity that steeply rises with film thickness (see ref. 2). Herein the minimum two monolayers of about 0.5 nm give rise to the repeatedly cited film resistivity of $\sigma_F\approx10^{-12}\ \Omega m^2$. That value is indeed very prevalent in traditional fiber brush operation, provided that the surfaces are otherwise clean [5,6]. The strong decrease of friction with increasing moisture film thickness is thus attended by a steep increase of the film resistivity.

The above considerations are crucial for the proposed several-fold increase of brush pressure in order to overcome the problem of uncontrollable Lorentz forces. Namely, such a brush pressure in-crease would typically lead to unacceptably high mechanical losses unless the coefficient of friction were to be drastically decreased; most favorably by a larger factor than the increase of $p_B$ so as to yield a net decrease of the mechanical loss. In line with the above considerations, this is possible by operating at a local contact spot pressure at which more than two monolayers are retained between the contact spots. Unfortunately, we do not as yet know the quantitative dependence of $\sigma_F$ and $\mu$ on local contact spot pressure, ${}_{el}p_c$, and must resort to estimating, as follows: Previous observations on increased film resistivity with sliding speed (see Table I, section VI. 4 of ref.6) suggest that for ${}_{el}p_c \approx 1.5\times10^8 N/m^2$ three to four molecular layers are retained at the spots. In that case friction is believed to have dropped to a low level of perhaps $\mu$=0.02, while the tunneling film resistivity will have risen by an order of magnitude to, say, $10^{-11}\ \Omega m^2$.

Accepting, then, ${}_{el}p_c = {}_{el}p_{select} \approx 1.5\times10^8 N/m^2$ as the desired local contact spot pressure for low friction, we have in effect determined the correlated value of $\beta_{select}$ at which the brush should be operated, namely via the relationship ${}_{el}p_{c=\beta}{}^{1/}{}_3H \approx 0.004\beta^{1/3}E$ (eq.4). However, the brush pressure to achieve $\beta_{select}$ depends on $r_c/d$ through eq.10, i.e. in our numerical example of $\alpha$=1 and f=0.15 and assuming Young's modulus to be, say, $E=10^{11} N/m^2$ $$p_B=\beta_{select}p_{trans}=\beta_{select}4.6\times10^{-6}\alpha Ef(r_c/d)^2=\beta_{select}6.9[N/cm^2](r_c/d)^2 \quad (22)$$

And similarly the specific brush resistance correlated with ${}_{el}p_{select}$ is found from eq.21. By controlling $r_c/d$, i.e. the microscopic smoothness of the substrate, one is therefore able to choose, for any desired local contact spot pressure, i.e. $\beta_{select}$, the correlated brush pressure and brush resistance.

Specifically, for the present numerical estimate, we find $$\beta_{select} \approx ({}_{el}p_{select}/0.004E)^3=(1.5\times10^8/0.004\times10^{11})^3 \cong 0.05 \quad (23a)$$

or similarly using the correlation with the hardness of $H=5\times10^8 N/m^2$ for copper, $$\beta_{select} \approx ({}_{el}p_{select}/H)^3=(1.5\times10^8/5\times10^8)^3 \cong 0.027 \quad (23b)$$

The best present estimate for $\beta_{select}$ that will produce a coefficient of friction of $\mu \cong 0.02$ in conjunction with a film resistivity of $\sigma_F \cong 10^{-11}\ \Omega m^2$ on account of three to four retained molecular layers of water between the contact spots is thus $0.025 \leqq \beta_{select} \leqq 0.5$. The resulting data are shown in FIG. 5. As seen, with increasing microscopic substrate smoothness, i.e. rising $r_c/d$, the brush pressure (eq. 12) increases to reach the desired 7 $N/cm^2$ so as to overcome Lorentz force fluctuations above $r_c/d \cong 4.5$. Meanwhile the brush resistance decreases steeply with $r_c/d$, namely as $$R_BA_B/(R_BA_B)_{st}=1.57(d/r_c)^2\beta_{select}{}^{-2/3} \quad (24)$$

so that it falls below the standard case for $r_c/d$ above $\cong$4, whereas the relative friction loss, $$L_M/L_{st}=\mu p_B/(\mu_{st}p_{Bst}) \cong 0.02p_B/(0.3\times1.5N/cm^2) \cong 0.044p_B=0.3\beta_{select}(r_c/d)^2[N/cm^2] \quad (25)$$

rises above unity only for $r_c/d>10$ or so. It follows, then, that in this particular example above $r_c/d$ about 4 and up to $r_c/d$ at least 10 conditions are excellent for not only counteracting Lorentz force variations but, beyond this, to lower the combined electrical and friction brush losses. In general, already $r_c/d$ values of 2 and above will cause marked improvement in brush performance.

In summary, then, according to this invention, metal fiber brushes can be, in fact should be best operated at significantly higher brush pressures in combination with much lower $\beta$-values than accepted hitherto. In that condition (1) Lorentz force variations will represent a percentage-wise smaller perturbation of brush pressures. (2) Total brush losses may be decreased or alternatively higher currents and speeds be attained at same loss per ampere conducted. (3) On account of low local pressures at contact spots, brush wear is virtually eliminated.

Attaining the indicated outstanding results will require careful tuning of brush operating conditions and above all excellent control of $r_c$, i.e., surface undulations of the substrate. However, even though, as seen in FIG. 5, the desired values of $r_c/d$ are rather large, the corresponding smoothness can be obtained, e.g. through electropolishing of ground or carefully machined/honed surfaces. This so on account of the rather small fiber diameters commonly used, e.g. d=50 $\mu$m Referring again to the drawings, wherein like reference labels designate identical or corresponding parts throughout the several views, FIGS. 1A–1E show examples of schematic cross-sectional views of different profiles of brush substrates and resulting contact spots. The bush substrates have surface irregularities, i.e., the surface of the brush substrate is not perfectly smooth. These surface irregularities may include asperities and/or grooves. The asperities and grooves may be regular, i.e., regular grooving or a regular pattern of asperities. FIG. 1A is an illustration of a simple sinusoidal grooving seen normal to sliding direction and at the same time clarifies the meaning of the parameters A, $\lambda$ and $r_c$. FIG. 1B shows the same grooving but with flattened crests as would impart an increased asperity radius $r_c$ in the plane of the drawing to foil brushes when run with the foils parallel to the plane of the drawing. FIG. 1C shows the profile of a grooving, again seen normal to sliding direction, particularly suitable for foil brush operation, in which both the crests and troughs are flattened to the effect that both of the corresponding radii of curvature are increased. FIG. 1D is a grooving profile that would be suitable for the operation of metal fiber brushes whereby the fiber ends run in the troughs. The flattened shape of the troughs provides a correspondingly large $r_c$ value for the asperities at the fiber ends. The sharply peaked crests between the grooves provide efficient separators to keep fiber ends locked within their respective grooves. FIG. 1E shows a grooving profile including overhangs. Over-hangs should be avoided, firstly because of their potential for catching wear debris which then can damage the brushes in the course of sliding and, secondly, because of their potential for wearing away fiber ends as indicated. FIGS. 2A and 2B clarify the means whereby grooving as in FIGS. 1A to 1C, and by implication many others, can be produced. Specifically, FIG. 2A shows a schematic perspective view of a tool with a wave-shaped cutting edge for cutting a grooving profile into a substrate. FIG. 2B shows the tool of FIG. 1F in position during cutting the profile into the substrate which in this figure is rotated, e.g., in a lathe, as indicated by the arrows.

FIG. 3A shows a fiber end encountering isolated flat asperities of closely similar elevation so as to form, in this case, four separate contact spots. Note that in FIGS. 3A and 3B the size of the contact spots is greatly exaggerated. In fact, the total contact spot area will typically amount to only fractions of one percent of the working surface. Also note that on FIG. 3B the two foils of a foil brush are seen sliding in an orientation mildly inclined against the foil normal, on a sinusoidal substrate grooving of the type of FIG. 1A.

FIGS. 4A–4F show schematic views of sections through different brushes, all except the foil brush in FIG. 4D comprising more than one type of fiber or foil, in position relative to substrate profilings adapted to them, except in FIG. 4E where the substrate is not shown. The sliding direction is normal to the plane of the drawing unless otherwise indicated by corresponding arrows labeled v. FIG. 4A is the cross-sectional view of the tips of two support fibers oriented normal to the average interface area that are guided in relatively deep grooves, and between them parallel regular fibers that run on an otherwise smooth substrate but studded with microscopically smooth isolated asperities. Equivalently, FIG. 4A can be read as showing the cut edges of two support foils running in grooves and thinner regular foils running on an otherwise smooth substrate that is studded with microscopically smooth asperities. FIG. 4B is a schematic view of part of the leading edge of the same foil brush depicted in FIG. 4A but in a cut through the foils parallel to and above the average surface level of the substrate. FIG. 4C shows the same type of brush as in FIG. 4A, i.e. comprising ordinary and support fibers or foils, but running at a slant relative to the substrate, with the support fibers or foils guided in correspondingly slanted, asymmetrically shaped grooves, and between these regular fibers running with a slant on a surface studded with relatively flat isolated contact spots. FIG. 4D is a schematic cross-sectional view parallel to the substrate plane of the cross-section of a foil brush of lozenge-shape, running on commutator bars with separated asperities. FIG. 4E is a hybrid foil/fiber brush, i.e. parallel foils with fibers between them, whose cross-section and sliding direction is similarly shaped as in FIG. 4D but sliding on a substrate that is not shown and may be smooth or be provided with any of the various proposed grooves or contact spots patterns. FIG. 4F is the cross-sectional view of a brush of rounded cross-section composed of support foils, regular foils and/or fibers, a zone of increased electrical resistivity at the trailing end, and "lightning rod" fibers concentrated near the trailing end of the brush, sliding along commutator bars which, together with the insulators between the bars, are profiled with grooves for the guidance of the support fibers.

FIGS. 5A and 5B show examples of corrugations in foils of foil brushes so as to either increase their mechanical compliance via horizontal corrugations as in FIG. 5A or wavy slanted corrugations in FIG. 5B. These are but two specific examples of the possible use of foil corrugations for the purpose of modifying the mechanical stiffness of foils. Generally, although not necessarily, such corrugations should be parallel and coordinated among neighboring foils so as to reduce mutual friction between the foils that would tend to reduce brush compliance. Note that in line with FIG. 3B the foils could be arbitrarily inclined to the sliding direction.

FIG. 6 illustrates the forecast performance of Cu fiber brushes of f=15% packing fraction as a function of $r_c/d$, i.e. the ratio of the substrate's average asperity radius of curvature to fiber diameter, when local pressure at the contact spots is so low, namely $1.5\times10^4$N/cm$^2$, as to engender a friction of $\mu$=0.02 on account of a ≅1 nm thick moisture film. Above a brush pressure of $p_B\cong7$N/cm$^2$, interference of uncontrolled Lorentz forces with brush force application is expected to be negligible. As seen, at, say, $r_c/d=7$, not only would the Lorentz force problem be overcome but total brush losses would be considerably reduced compared to standard brush application. Meanwhile, on account of very low local contact spot pressure wear rates would be essentially zero.

Profiling a brush substrate, whether slip ring, commutator bars or other, with a grooving is straightforward and unproblematic since it can be done with an appropriately shaped, tool in relative motion. This may take the form of turning the substrate material as the work piece in a lathe, as sketched in FIG. 2B. In principle, the tool may machine just one groove at a time to be repositioned for making the next groove and on. However, that would be time-consuming and tedious, especially in view of the typically hair-fine widths of the grooves. Therefore the cutting edge of the tool will advantageously be shaped for the simultaneous cutting of multiple grooves as indicated in FIG. 1G. Shaping of such tools may be done by any available means, e.g. mechanically, via laser cutting, or via etching in combination with lithography or use of temporary protective masks. Alternatively, if a sufficiently fine-grained substrate material is chosen, it may be cheaper to cast it into a form that comprises the grooves. However, it is doubtful whether this method will be cost effective or precise enough. Additional methods doubtlessly exist, including evaporating the substrate material into a shaped form, perhaps made of a ceramic or of graphite, among doubtlessly many methods which at this time do not come to mind or are unknown to the inventor.

More problematic than the cutting of grooves is the formation of multiple, close spaced asperities of predetermined similar shapes and sizes. Four different approaches are deemed feasible.

(i) In this day and age of micro-chips, doubtlessly many related methods exist which could be utilized for the present purpose, mostly probably based on a combination of lithography and etching. These are liable to be the most cost-effective in the long run since they are adaptable to automation by the use of methods which have long since been developed by the computer industry and might be similarly utilized for grooving as well as formation of separate asperities. Insulating or high-resistance surface layers, which may remain on the substrate after completion of the profiling, will have to be removed as a last step, as already indicated for the case of electrolytic polishing or buffing.

(ii) Laser cutting is another method. It is expected to be adaptable to a wide range of shapes but probably to be fairly expensive.

(iii) More traditionally, one could make the desired asperity-covered surfaces by spraying an aerosol of liquid metal, e.g. copper or nickel or chromium etc., on the heated, pre-shaped substrate. In this, one will have to experimentally determine suitable droplet sizes, spraying velocities and temperatures to achieve the desired asperity size, shape and density. By spraying the liquid metal aerosol vertically onto the substrate, roughly rotationally symmetrical asperities will be obtained, while spraying at an angle will cause elongated asperities.

(iv) Separated asperities, and in particular asperities strongly elongated in sliding direction, could be readily formed on substrates by a totally different method as follows: Through suitable casting of suitable alloys, followed by mechanical working such as rolling or drawing and/or by heat treatments as may be suitable, one may produce harder precipitates or eutectic lamellae of desired form, size and density dispersed in a softer matrix. Then, after careful overall shaping through some cutting process, e.g. turning on a lathe, grinding, milling etc., one may produce a metallographic "relief" polish which lets the precipitates project above the average surface to the desired height so as to form the asperities. This metallographical relief polish can be done either mechanically, i.e. by buffing or polishing on a soft textile material such as cloth or felt, or a real or artificial chamois leather already mentioned, typically with the aid of fine alumina or diamond powder. Alternatively it could be done by electrolytic polishing. And, again, if a remnant insulating layer should remain after the polish it must be removed, e.g. through electrochemistry, mild etching or annealing in an inert or reducing atmosphere, as already indicated above.

In all above methods it is imperative that prior to profiling, whether by grooving or separated asperities, the substrates be very carefully shaped into the desired cylindrical surface or other overall shape, so as to minimize run-out. This is important because the wear rate sharply increases with the run-out, i.e. variations of surface from the rotation axis per revolution. Such run-out should always be kept below 0.001 inches i.e. about 25 μm.

k. Numeral Values Regarding Profiles of the Substrates

As discussed above, the substrate includes surface irregularities shaped and dimensioned to provide multiple contact spots to plural current conducting elements. The surface irregularities include asperities and/or grooves. In order to provide multiple contact spots, the number of asperities per square centimeter (i.e., the density (D) of asperities) is preferably within the inclusive range of $2500/cm^2$ to $10^7/cm^2$. In more detail, the contact spots on the current conducting elements are preferably on average less than 100 d apart, where d is the average diameter of the current conducting elements in the brushes (i.e. fibers or foils). Further, it is preferable to have between 1 and 10 contact spots per fiber [4–6]. Generally, the diameter of fibers (and thickness of foils) included in a brush is within the inclusive range of 10 μm and 200 μm. Consequently, the asperities are preferably dimensioned such that they provide between 1 contact spot per d=200 μm fiber and ten contact spots per 10 μm fiber, i.e. $1/(200\ \mu m)^2 \leqq D$ (density of asperities) $\leqq 10/(10\ \mu m)^2$ or $2500/cm^2 \leqq D$ (density of asperities) $\leqq 10^7/cm^2$.

Further, the grooves are preferably dimensioned such that they provide contact spots for foils less than 100 d apart along the individual foil. Moreover, for the thickest foils, it is preferable to have relatively dense groove spacings. Thus, with $10\ \mu m \leqq d \leqq 200\ \mu m$, groove spacings (λ, see FIG. 1) for foil brushes are preferably within the inclusive range of 10 μm to 1000 μm. The same values are suitable for fiber brushes.

In addition, groove widths for guiding fibers, support fibers and lengthwise sliding foils (see FIGS. 1E, 4A, 4B and 4C, for example) are preferably moderately larger than the fiber or foil diameters, i.e. between 10 μm and 200 μm, assuming that support fibers, too, are not thicker than 200 μm. Groove depths (A, FIG. 1A) preferably compare to, or are moderately larger than, the spacing λ, i.e. again between 10 μm and 200 μm and for the thickest foils perhaps as large as 1 mm.

Further, to optimize brush performance in accordance with FIG. 6, a surface radius of curvature ($r_c$) of the surface irregularities are preferably related to d as $2 \leqq r_c/d \leqq 10$, or $2\ d \leqq r_c 10\ d$. Hence, with d between 10 μm and 200 μm, the surface radius of curvature are preferably within the inclusive range of 20 μm to 2 mm. For other purposes, $r_c$, is not restricted except that, on account of too rapid wear, surface radius of curvature's well below 10 μm are preferably avoided for substrates that are significantly harder than the brush material.

Obviously, numerous modifications and variations of the present invention are possible in light of the above teachings. It is therefore to be understood that within the scope of the appended claims, the invention may be practiced otherwise than as specifically described herein.

Appendix

[1] D. Kuhlmann-Wilsdorf, D. D. Makel and G. T. Gillies, "Continuous Metal Fiber Brushes", U.S. patent application, . . . .

[2] R. Holm. "Electrical Contacts—Theory and Applications" 4th edition (Springer Berlin/N.Y., 1967).

[3] P. B. Haney, D. Kuhlmann-Wilsdorf and H. G. F. Wilsdorf, "Production and Performance of Metal Foil Brushes", WEAR, 73 (1981), pp. 261–282

[4] D. Kuhlmann-Wilsdorf, "Uses of Theory in the Design of Sliding Electrical Contacts", ICEC-IEEE Holm 91 (37th. Holm Conference on Electrical Contacts, IEEE, Chicago, Oct. 6–9, 1991), pp. 1–24.

[5] D. Kuhlmann-Wilsdorf, "Electrical Fiber Brushes—Theory and Observations", ICEC-IEEE Holm 95 (41st. Holm Conference on Electrical Contacts, IEEE, Montreal, Canada, Oct. 2–4, 1995), pp.295–314.

[6] D. Kuhlmann-Wilsdorf, "Metal Fiber Brushes" (Chapter 20, pages 943–1017, in "Electrical Contacts: Principles and Applications", Eds. Slade/Lee/Witter/Horn/Shobert, Marcel Dekker, N.Y.), 1999.

[7] Y. J. Chang and D. Kuhlmann-Wilsdorf, "A Case of Wear Particle Formation Through Shearing-Off at Contact Spots Interlocked Through Micro-Roughness in 'Adhesive' Wear", Wear 120 (1987), pp. 175–197.

[8] Yu Jun Chang and Doris Kuhlmann-Wilsdorf, "Comparison of Wear Chip Morphology with Different Models of 'Adhesive' Wear", in "Approaches to Modeling of Friction and Wear", (Eds. F. F. Ling and C. H. T. Pan, Springer, New York 1988), pp. 118–124.

[9] J. L. Young, "Mixing of Material During Sliding With and Without Lubricants ", M. S. Thesis, Dept. of Materials Science and Engineering, Univ. of Virginia, October 1998.

[10] R. McNab and P. Reichner, "Environment and Brushes for High-Current Rotating Electrical Machinery" U.S. Pat. No. 4,277,708, July 1981.

[11] P. Reichner, "Metallic Brushes for Extreme High Current Applications", *Electrical Contacts*—1979. 25th Holm Conf., Chicago, Ill. 1980, pp.191–197.

[12] P. Reichner, "High Current Tests of Metal Fiber Brushes", *Electrical Contacts*—1980, 26th Holm Conf. Chicago, Ill., 1980, pp.73–76.

[13] C. M. Adkins III and D. Kuhlmann-Wilsdorf, "Development of High-Performance Metal Fiber Brushes I—Background and Manufacture", in Electrical Contacts—1979 (Proc.25th Holm Conf. on Electrical Contacts, Ill. Inst. Techn., Chicago, Ill., September 1979), pp. 165–170.

[14] C. M. Adkins III and D. Kuhlmann-Wilsdorf, "Development of High-Performance Metal Fiber Brushes II—Testing and Properties", ibid, pp. 171–184.

[15] C. M. Adkins III and D. Kuhlmann-Wilsdorf, "Development of High-Performance Metal Fiber Brushes III—Further Tests and Theoretical Evaluation", in "Electrical Contacts—1980" (Proc. 26th Holm Conf. on Electrical Contacts, Ill. Inst. Techn., Chicago, Ill., September/October 1980), pp. 67–72.

[16] D. Kuhlmann-Wilsdorf, "What Role for Contact Spots and Dislocations in Friction and Wear?", D. Kuhlmann-Wilsdorf, WEAR, 200 (1996), pp. 8–29.

[17] D. Kuhlmann-Wilsdorf, "A Versatile Electrical Fiber Brush and Method of Making", U.S. Pat. No. 4,358,699 granted Nov. 9, 1982.

[18] C. Gao and D. Kuhlmann-Wilsdorf, "Adsorption Films, Humidity, Stick-Slip and Resistance of Sliding Contacts", ICEC—IEEE Holm 90 (1990 Holm Conference on Electrical Contacts, IEEE, Montreal, Aug. 20–24, 1990, IEEE, Piscataway, N.J. 1990), pp. 292–300.

[19] C. Gao and D. Kuhlmann-Wilsdorf, "Experiments on, and a Two-Component Model for, the Behavior of Water Nano-Films on Metals", in "Thin Films: Stresses and Mechanical Properties II", (Mater. Res. Soc. Symp Proc., 188, Eds. M. F. Doerner, W. C. Oliver, G. M. Pharr and F. R. Brotzen, Mater. Res. Soc., Pittsburgh, Pa., 1990), pp. 237–242.

[20] R. A. Burton (editor): "Thermal Deformation in Frictionally Heated Systems", (Elsevier Sequoia, Lausanne/N.Y., 1980).

[21] R. A. Burton, Wear, Vol.59, 1980, p.1.

[22] D. Kuhlmann-Wilsdorf, D. D. Makel, N. A. Sondergaard and D. W. Maribo, "On the Two Modes of Operation of Monolithic Ag-C Brushes", Electrical Contacts-1988, reprinted in IEEE Trans. Comp. Hybrids and Manuf. Techn., 12 (1989) pp. 237–245.

[23] C. Gao and D. Kuhlmann-Wilsdorf, "Observations on the Effect of Surface Morphology on Friction and Sliding Modes", in "Tribology of Composite Materials", (Eds. P. K. Rohatgi, P. J. Blau and C. S. Yust, ASM Intl., Materials Park, Ohio 1990, pp. 195–201.

[24] D. Kuhlmann-Wilsdorf and D. Alley, "Commutation with Metal Fiber Brushes", Proc. 1987 Intl. Current Collector Conf., Nov. 16/17, Austin, Tex. (Ed. J. H. Gully.

[25] D.Kuhlmann-Wilsdorf and D. M. Alley, IEEE Trans. Components, Hybrids and Manuf. Techn., 12 (1989), pp. 246–253.

[26] D. Kuhlmann-Wilsdorf, D. D. Makel, N. A. Sondergaard and D. W. Maribo, "Interfacial Temperatures and Transition of Surface Films on Monolithic Silver-Graphite Brushes Sliding on Copper", Electric Contacts, (Proc. 14th International Conf. on Electric Contacts, Paris, France, Jun. 20–24, 1988, SEE), pp. 47–53.

[27]D. Kuhlmann-Wilsdorf, D. D. Makel, N. A. Sondergaard and D. W. Maribo, "Friction, Wear and Interfacial Temperatures in Metal-Graphite Composites Cast Reinforced Metal Composites (Eds. S. G. Fishman and A. K. Dhingra, ASM International, Metals Park, Ohio, 1988), pp. 347–359.

D. Kuhlmann-Wilsdorf and D. D. Makel, "Microstructural Instability in Metal-Graphite Lubrication Films", in "Metastable Microstructures: Principles, Design and Applications" (Eds. D. Banerjee and L. A. Jacobson, Vedams Books International, New Delhi, 1992; Proc. U.S.-India Workshop on Metastable Microstructures, Goa, India, Mar. 30, 1989–Apr. 2, 1989) pp.257–274.

What is claimed is:

1. A device for making electrical connection with an electrical brush having a plurality of current conducting elements, said device comprising a substrate having microscopic surface irregularities; and said surface irregularities shaped and dimensioned to provide multiple contact spots to each current conducting element of said plurality of current conducting elements;

wherein said surface irregularities are configured to provide contact spots spaced at least less than 100 d on each element of said plurality of current conducting elements, where d is a diameter of each element of the plurality of current conducting elements.

2. The device according to claim 1, wherein the surface irregularities comprise a plurality of asperities.

3. The device according to claim 1, wherein the surface irregularities comprise a plurality of grooves.

4. The device according to claim 3, wherein the plurality of grooves are substantially parallel to each other.

5. The device according to claim 1, wherein the surface irregularities comprise a plurality of asperities and grooves.

6. The device according to claim 5, wherein the plurality of asperities are within the grooves and between the grooves.

7. The device according to claim 1, wherein the substrate comprises a surface material harder than the plurality of current conducting elements.

8. The device according to claim 1, wherein the surface irregularities comprise a shape and dimension satisfying the following equation:

$$2 \leqq r_c/d \leqq 10,$$

where $r_c$ is an average radius of the surface irregularities, and d is an average diameter of the plurality of current conducting elements.

9. The device according to claim 1, wherein the substrate comprises a surface material selected from the group consisting of titanium nitride and metal nitride.

10. The device according to claim 1, wherein the substrate comprises a surface material selected from the group consisting of brass, copper, nickel, stainless steel, titanium, copper alloy, nickel alloy, titanium alloy and chromium.

11. The device according to claim 1, wherein the substrate comprises a surface material selected from the group consisting of silver, gold, rhodium, platinum, iridium, silver alloy, gold alloy, rhodium alloy, and platinum alloy.

12. The device according to claim 1, wherein the substrate comprises a surface material including graphite.

13. The device according to claim 1, wherein the surface irregularities comprise laser-etched irregularities.

14. The device according to claim 1, wherein the surface irregularities comprise lithography-etched irregularities.

15. The device according to claim 1, wherein the surface irregularities comprise mechanically-polished irregularities.

16. The device according to claim 1, wherein the surface irregularities comprise metallographic electrolytic-polished irregularities.

17. The device according to claim 1, wherein the surface irregularities comprise liquid metal aerosol deposited irregularities.

18. The device according to claim 1, wherein, between the surface irregularities, local deviations from strict planarity of the substrate surface do not exceed 20 degrees.

19. The device according to claim 1, wherein, between the surface irregularities, local deviations from strict planarity of the substrate surface do not exceed 10 degrees.

20. The device according to claim 1, wherein, between the surface irregularities, local deviations from strict planarity of the substrate surface do not exceed 0.60 degrees.

21. The device according to claim 1, wherein, between the surface irregularities, local deviations from strict planarity of the substrate surface do not exceed 0.01 degrees.

22. The device according to claim 1, wherein, between the surface irregularities, local deviations from strict planarity of the substrate surface do not exceed 0.024 degrees.

23. An electrical connection system, comprising:

an electrical brush having a plurality of current conducting elements; and a substrate having microscopic surface irregularities shaped and dimensioned to provide multiple contact spots to each current conducting element of said plurality of current conducting elements;

wherein said surface irregularities are configured to provide contact spots spaced at least less than 100 d on each element of said plurality of current conducting elements, where d is a diameter of each element of the plurality of current conducting elements.

24. The system according to claim 23, wherein the brush is configured to slide against the substrate and the plurality of current conducting elements are oriented parallel to a sliding direction of the brush.

25. The system according to claim 23, wherein the plurality of current conducting elements comprise a plurality of metal fibers.

26. The system according to claim 23, wherein the plurality of current conducting elements comprise a plurality of metal foils.

27. The system according to claim 23, wherein the plurality of current conducting elements comprise a plurality of metal fibers and foils.

28. The system according to claim 27, wherein the brush includes at least one of 1) a support fiber and 2) a support foil, and said surface irregularities comprise at least one groove configured to receive the at least one of the support fiber and support foil.

29. The system according to claim 23, wherein the plurality of current conducting elements comprise at least one arc-resistant metal fiber having a diameter which is less than an average diameter of the plurality of current conducting elements.

30. The system according to claim 29, wherein the arc-resistant metal fiber comprises at least one of a stainless steel metal fiber and a tungsten metal fiber.

31. The system according to claim 23, wherein the plurality of current conducting elements comprise at least one fiber including a protective coating with noble metals.

32. The claim according to claim 31, wherein said protective coating is selected from the platinum group.

33. The system according to claim 23, wherein the brush comprises a cross-sectional shape.

34. The system according to claim 23, wherein the brush comprises corrugated metal foils.

35. The system according to claim 23, wherein the brush comprises a foot print shape dimensioned to reduce arcs.

36. A method of making an electrical connection device comprising:

providing an electrical brush having a plurality of current conducting elements; and forming microscopic surface irregularities on a substrate to produce multiple contact posts to each current conducting element of said plurality of current conducting elements;

wherein said surface irregularities are configured to provide contact spots spaced at least less than 100 d on each element of said plurality of current conducting elements, where d is a diameter of each element of the plurality of current conducting elements.

37. The method according to claim 36, further comprising:

orienting the plurality of current conducting elements to be parallel to a sliding direction of the brush.

38. The method according to claim 36, further comprising:

orienting the plurality of current conducting elements to be at an angle to a sliding direction of the brush.

39. The method according to claim 34, wherein the forming step forms the surface irregularities by laser etching.

40. The method according to claim 36, wherein the forming step forms the surface irregularities by etching in combination with lithography.

41. The method according to claim 36, wherein the forming step forms the surface irregularities by mechanical relief polishing.

42. The method according to claim 36, wherein the forming step forms the surface irregularities by metallographic electrolytic polishing.

43. The method according to claim 36, wherein the forming step forms the surface irregularities by deposition of a liquid metal aerosol.

44. The method according to claim 36, wherein the forming step forms the surface irregularities by mechanically cutting the substrate with a pre-shaped tool.

45. The method according to claim 36, wherein the forming step forms the surface irregularities to satisfy the following equation:

$$2 \leq r_c/d \leq 10,$$

where $r_c$ is an average radius of the surface irregularities, and d is an average diameter of the plurality of current conducting elements.

46. A device for making electrical connection with an electrical brush having at least one current conducting element, said device comprising:

a substrate having microscopic surface irregularities; and said surface irregularities shaped and dimensioned to provide plural contact spots with the at least one current conducting element, wherein dimensions of the surface irregularities are in the order of magnitude of a dimension of the at least one current conducting element to be electrically connected with the device;

wherein said surface irregularities are configured to provide contact spots spaced at least less than 100 d on each element of said plurality of current conducting elements, where d is a diameter of each element of the plurality of current conducting elements.

47. The device according to claim 46, wherein the dimensions of the surface irregularities are on the order of magnitude of 20 $\mu$m.

48. The device according to claim 46, wherein the surface irregularities comprise grooves which are substantially parallel to a sliding direction of the electrical brush.

49. A substrate for making electrical connection with an electrical brush, said substrate comprising:

a plurality of microscopic asperities provide in a surface of the substrate; and said asperities having a density (D) in the range of:

$$2500/\text{cm}^2 \leq D \leq 10^7/\text{cm}^2,$$

where the density (D) is defined as a number of asperities per square centimeter.

50. The substrate according to claim 49, further comprising a plurality of grooves.

51. The substrate according to claim 50, wherein the plurality of grooves are substantially parallel to each other.

52. The substrate according to claim 50, wherein the plurality of asperities are within the grooves and between the grooves.

53. The substrate according to claim 50, wherein adjacent grooves of the plurality of grooves has a spacing ($\lambda$) is in the range of:

$$10\ \mu\text{m} \leq \lambda \leq 1000\ \mu\text{m}.$$

54. The substrate according to claim 50, wherein a width of a respective groove of the plurality of grooves is within the inclusive range of 10 $\mu$m and 200 $\mu$m.

55. The substrate according to claim 50, wherein a depth of a respective groove of the plurality of grooves is within the inclusive range of 10 $\mu$m and 1 $\mu$m.

56. The substrate according to claim 50, wherein a depth of a respective groove of the plurality of grooves is within the inclusive range of 10 μm and 200 μm.

57. The substrate according to claim 49, wherein a respective asperity of the plurality of asperities has a surface radius of curvature ($r_c$) in the range of:

$$20\ \mu m \leqq r_c \leqq 2\ mm.$$

58. The substrate according to claim 50, wherein a respective groove of the plurality of grooves has a surface radius of curvature ($r_c$) in the range of:

$$20\ \mu m \leqq r_c \leqq 2\ mm.$$

59. The substrate according to claim 49, further comprising a surface material selected from the group consisting of titanium nitride and metal nitride.

60. The substrate according to claim 49, further comprising a surface material selected from the group consisting of brass, copper, nickel, stainless steel, titanium, copper alloy, nickel alloy, titanium alloy and chromium.

61. The substrate according to claim 49, further comprising a surface material selected from the group consisting of silver, gold, rhodium, platinum, iridium, silver alloy, gold alloy, rhodium alloy, and platinum alloy.

62. The substrate according to claim 49, further comprising a surface material including graphite.

63. A substrate for making electrical connection with an electrical brush, said substrate comprising:

a plurality of microscopic grooves provided in a surface of the substrate: and adjacent grooves of the plurality of grooves having a spacing (λ) in a range of:

$$10\ \mu m \leqq (\lambda) \leqq 1000\ \mu m.$$

64. The substrate according to claim 63, wherein a width of a respective groove of the plurality of grooves is within the inclusive range of 10 μm and 200 μm.

65. The substrate according to claim 63, wherein a depth of a respective groove of the plurality of grooves is within the inclusive range of 10 μm and 1 mm.

66. The substrate according to claim 63, wherein a depth of a respective groove of the plurality of grooves is within the inclusive range of 10 μm and 200 μm.

67. The substrate according to claim 63, wherein a respective groove of the plurality of grooves has a surface radius of curvature ($r_c$) in the range of:

$$20\ \mu m \leqq r_c \leqq 2\ mm.$$

68. The substrate according to claim 63, wherein the plurality of grooves are substantially parallel to each other.

69. The substrate according to claim 63, further comprising a plurality of asperities.

70. The substrate according to claim 69, wherein the plurality of asperities are within the grooves and between the grooves.

71. The substrate according to claim 69, wherein the plurality of asperities has a density (D) in the range of:

$$2500/cm^2 \leqq D \leqq 10^7/cm^2,$$

where the density (D) is defined as a number of asperities per square centimeter.

72. The substrate according to claim 69, wherein a respective asperity of the plurality of asperities has a surface radius of curvature ($r_c$) in the range of:

$$20\ \mu m \leqq r_c \leqq 2\ mm.$$

73. The substrate according to claim 63, further comprising a surface material selected from the group consisting of titanium nitride and metal nitride.

74. The substrate according to claim 63, further comprising a surface material selected from the group consisting of brass, copper, nickel, stainless steel, titanium, copper alloy, nickel alloy, titanium alloy and chromium.

75. The substrate according to claim 63, further comprising a surface material selected from the group consisting of silver, gold, rhodium, platinum, iridium, silver alloy, gold alloy, rhodium alloy and platinum alloy.

76. The substrate according to claim 63, further comprising a surface material including graphite.

* * * * *